US012687623B2

(12) United States Patent
Kang et al.

(10) Patent No.: US 12,687,623 B2
(45) Date of Patent: Jul. 21, 2026

(54) SELF-CONTAINED RANGE DETECTION SYSTEMS WITH RECONFIGURABLE CHATTER-MITIGATED OUTPUT INDICATION

(71) Applicant: Banner Engineering Corp., Minneapolis, MN (US)

(72) Inventors: Chunmei Kang, Minneapolis, MN (US); Amanda Nelson, Minneapolis, MN (US); Brad Ragozzino, Minneapolis, MN (US); William Theunissen, Minneapolis, MN (US); Arthur Padget, Minneapolis, MN (US); Robb Weidemann, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 902 days.

(21) Appl. No.: 17/823,361

(22) Filed: Aug. 30, 2022

(65) Prior Publication Data

US 2023/0064350 A1 Mar. 2, 2023

Related U.S. Application Data

(60) Provisional application No. 63/260,786, filed on Aug. 31, 2021.

(51) Int. Cl.
*G01S 7/51* (2006.01)
*F21S 8/08* (2006.01)
(Continued)

(52) U.S. Cl.
CPC ............ *G01S 7/51* (2013.01); *F21V 23/0471* (2013.01); *G01S 7/497* (2013.01); *F21S 8/08* (2013.01);
(Continued)

(58) Field of Classification Search
CPC . G01S 7/51; G01S 7/497; G01S 17/08; G01S 17/88; G01S 15/88; G01S 13/88; G01S 17/04; F21V 23/0471; G08G 1/142
See application file for complete search history.

(56) References Cited

U.S. PATENT DOCUMENTS

| | | |
|---|---|---|
| 4,072,055 A | 2/1978 | Elliott |
| 4,402,224 A | 9/1983 | Fukushima |
| | (Continued) | |

FOREIGN PATENT DOCUMENTS

| | | |
|---|---|---|
| AU | 2018236761 A1 | 10/2018 |
| CN | 109073517 A | 12/2018 |
| | (Continued) | |

OTHER PUBLICATIONS

Chapter II Demand filed in related International Application No. PCT/US2022/075689, dated Jun. 2, 2023, 6 pages.
(Continued)

*Primary Examiner* — Yuqing Xiao
*Assistant Examiner* — Rachel Nguyen
(74) *Attorney, Agent, or Firm* — Thompson Patent Law Offices PC

(57) ABSTRACT

Apparatus and associated methods relate to detection systems with chatter-mitigated output indication. In an illustrative example, a sensor may generate a detection signal as a function of a physical relationship of a target to the sensor. A control circuit may, for example, generate a control signal in response to the detection signal and as a function of a predetermined indication response profile defining a transition threshold for each of multiple nominal transition points. A light-emitting indicator array may, for example, generate spatially distributed indication in response to the control signal. The indication may, for example, change from a first spatial distribution to a second spatial distribution in
(Continued)

response to the detection signal crossing a first nominal transition point by at least a corresponding transition threshold ($\delta_{1i}$). Various embodiments may, for example, advantageously prevent the visual indication from responding to perturbations in the detection signal.

20 Claims, 14 Drawing Sheets

(51) Int. Cl.

| | |
|---|---|
| *F21V 23/04* | (2006.01) |
| *F21W 111/027* | (2006.01) |
| *G01S 7/497* | (2006.01) |
| *G01S 17/931* | (2020.01) |

(52) U.S. Cl.
CPC ...... *F21W 2111/027* (2013.01); *G01S 17/931* (2020.01)

(56) References Cited

U.S. PATENT DOCUMENTS

| | | | |
|---|---|---|---|
| 5,321,490 | A | 6/1994 | Olson et al. |
| 6,265,974 | B1 | 7/2001 | D'Angelo et al. |
| 6,715,213 | B2 | 4/2004 | Richter |
| 6,844,713 | B2 | 1/2005 | Steber et al. |
| 8,928,475 | B2 | 1/2015 | Bement |
| 9,779,546 | B2 | 10/2017 | Hunt et al. |
| 9,824,571 | B2 | 11/2017 | Sedayao et al. |
| 9,913,340 | B2 | 3/2018 | Liu et al. |
| 10,488,245 | B2 | 11/2019 | Camps et al. |
| 10,510,251 | B2 * | 12/2019 | Rosen .................... G08G 1/149 |
| D897,227 | S | 9/2020 | Xu et al. |
| 11,841,261 | B2 | 12/2023 | Baur |
| 11,874,399 | B2 | 1/2024 | Shin et al. |
| D1,015,183 | S | 2/2024 | Isshiki |
| 2007/0050240 | A1 | 3/2007 | Belani et al. |
| 2007/0177790 | A1 | 8/2007 | Ban et al. |
| 2010/0295940 | A1 | 11/2010 | Schwarte |
| 2011/0288667 | A1 | 11/2011 | Noda et al. |
| 2013/0096713 | A1 | 4/2013 | Takizawa et al. |
| 2015/0192675 | A1 * | 7/2015 | Stecker .................... G01V 8/12 |
| | | | 356/448 |
| 2016/0016311 | A1 | 1/2016 | Konolige et al. |
| 2016/0347558 | A1 | 12/2016 | Eto et al. |
| 2017/0103648 | A1 * | 4/2017 | Bodurka ................ G08G 1/146 |
| 2017/0228885 | A1 | 8/2017 | Baumgartner |
| 2018/0249565 | A1 | 8/2018 | Recker et al. |
| 2018/0275310 | A1 | 9/2018 | Hörsch et al. |
| 2018/0293743 | A1 | 10/2018 | Iida et al. |
| 2019/0056258 | A1 | 2/2019 | Camps et al. |
| 2019/0333358 | A1 * | 10/2019 | Haddon .................. G01S 17/08 |
| 2020/0142041 | A1 | 5/2020 | Gassend et al. |
| 2020/0191580 | A1 | 6/2020 | Christensen et al. |
| 2020/0209399 | A1 | 7/2020 | Talapov |
| 2020/0298749 | A1 * | 9/2020 | Yang ........................ G01S 17/66 |
| 2020/0341126 | A1 | 10/2020 | Yates et al. |
| 2022/0016758 | A1 | 1/2022 | Whitiker |
| 2022/0253794 | A1 | 8/2022 | Brandt |
| 2022/0260720 | A1 | 8/2022 | Hammes et al. |
| 2022/0351121 | A1 | 11/2022 | Dattamajumdar et al. |
| 2024/0163415 | A1 | 5/2024 | Vu et al. |

FOREIGN PATENT DOCUMENTS

| | | |
|---|---|---|
| CN | 111656148 A | 9/2020 |
| CN | 112074458 A | 12/2020 |
| CN | 112203720 A | 1/2021 |
| CN | 118696250 A | 9/2024 |
| DE | 202007005495 U1 | 8/2007 |
| GB | 2199981 B | 9/1990 |
| JP | 2014185901 A | 10/2014 |

| | | |
|---|---|---|
| WO | 2021151171 A1 | 8/2021 |
| WO | 2021239260 A1 | 12/2021 |
| WO | 2023154963 A1 | 8/2023 |

OTHER PUBLICATIONS

Informal Communication in related International Application No. PCT/US2022/075689, dated Aug. 8, 2023, 5 pages.

Informal Communication in related International Application No. PCT/US2022/075689, dated Jul. 7, 2023, 2 pages.

International Search Report and Written Opinion of the International Searching Authority in related International Application No. PCT/US2023/062595, dated Jun. 7, 2023, 13 pages.

Written Opinion of the International Preliminary Examining Authority in related International Application No. PCT/US2022/075689, dated May 4, 2023, 9 pages.

IFM Electronic, Photoelectric 3D level measurement and point level detection, accessed Jan. 20, 2023, https://www.ifm.com/de/en/shared/technologies/o3d/level-measurement.

Intermediate Response to Written Opinion dated Jun. 2, 2023, filed with the European Patent Office in Application No. PCT/U22022/075689, 14 pages.

International Preliminary Report on Patentability, dated Dec. 15, 2023, issued by the European Patent Office in Application No. PCT/US2022/075689, 9 pages.

Response Written Opinion of the International Preliminary Examining Authority in related International Application No. PCT/US2023/062595, dated Dec. 21, 2023, 31 pages.

Written Opinion of the International Preliminary Examining Authority in related International Application No. PCT/US2023/062595, dated Oct. 24, 2023, 9 pages.

Chapter II Demand filed in related International Application No. PCT/US22/75689, dated Apr. 5, 2023, 26 pages.

International Search Report and Written Opinion of the International Searching Authority in related International Application No. PCT/US2022/075689, dated Dec. 22, 2022, 12 pages.

Balluff Inc, "BNI0082 SmartLight—LED stack lights," Balluff, accessed Aug. 4, 2021, <https://my.balluff.com/en-US/products/BNI0082>.

Balluff Inc, "Smartlight Indicator for Pick-To-Light Applications," Balluff, Data Sheet 939802. [Online]. Available: <https://assets.balluff.com/WebBinary1/LIT_FLY_SMARTLIGHT_PICK_TO_LIGHT_EN_D18.pdf>.

Balluff Inc, "The Future of Tower Lights and Process Visualization," Balluff, Catalog. [Online]. Available: <https://assets.balluff.com/WebBinary1/LIT_BRO_SMARTLIGHT_UCM_EN_E18_DRW_919984_02_000.pdf>.

Baumer, "Radar Distance Measuring Sensors: RR30.DAJ2-IGPI.9VF," Baumer, accessed Jul. 30, 2021, <https://www.baumer.com/ca/en/p/42883>.

Hareendran, T.K., Radar Light Bulbs & Random Views, Codrey Electronics, Feb. 12, 2020, accessed Aug. 15, 2022, <https://www.codrey.com/electronic-circuits/radar-light-bulbs-random-views/>.

LogicXYZ, "Garage Parking Assistant—Park your vehicle precisely and consistently. Large Digital Display to show the distance from the wall—No more scratched bumper!," Amazon, accessed Jul. 30, 2021, <https://www.amazon.com/Garage-Parking-Assistant-precisely-consistently/dp/B079VX8RJ8/ref=sr_1_16?dchild=1&keywords=garage+parking+assist&qid=1627681568&sr-8-16>.

P. Pandya, "Software PWM Generation for LED Dimming and RGB Color Applications," Microchip Technology Inc., AN1074, 2007.

Palmer, R., "Robot Skin Lights Up In Response To Pressure, Could Cover Prosthetic Limbs, Make Smart Wallpaper [Video]," International Business Times, Jul. 22, 2013, accessed Jul. 30, 2021, <https://www.ibtimes.com/robot-skin-lights-response-pressure-could-cover-prosthetic-limbs-make-smart-wallpaper-1355355>.

S. Mohsin, "Arduino Ultrasonic sensor hc-sr04 Measure distance with LEDs," Mr.ElectroUino, Jul. 19, 2019, accessed Jul. 20, 2021, <https://mrelectrouino.blogspot.com/2019/07/arduino-ultrasonic-sensor-hc-sr04.html>.

(56)               References Cited

OTHER PUBLICATIONS

Scale and Control Inc., "Radar Sensors," Scale and Control Inc., accessed Jul. 30, 2021, <https://www.scaleandcontrol.com/radar-sensors.html>.

Shenzhen Starshine Industrial Co.,ltd, "European License Plate Parking Sensor system, car parking sensor with 2 Sensors and 1 Camera," Global Sources, accessed Jul. 30, 2021, <https://www.globalsources.com/Parking-assist/parking-assist-system-1184609190p.htm>.

SSI Technologies, "SSI Technologies DFT-110 Ultrasonic Digital<Drum Level Gauge, 2" and ¾", Bung Attachement, 8.75"×8.75"×4.5"," Amazon, accessed Jul. 30, 2021, https://www.amazon.com/SSI-TECHNOLOGIES-DFT-110-Ultrasonic-Attachement/dp/B00H9ZWVVU/ref=sr_1_2?dchild=1&keywords=drum%2Blevel%2Bgauge&qid=1627607062&sr=8-2&th=1>.

Thedeveloperguy, "LED Ring Distance Sensor," Instructables, accessed Jul. 30, 2021, <https://www.instructables.com/LED-Ring-Distance-Sensor/>.

Werma USA Inc., "CO2 Traffic Light—649.000.10—WERMA Signaltechnik GmbH," WERMA, accessed Jul. 30, 2021, <https://www.werma.com/en/s_c23116700/CO2_Traffic_Light/64900010.html>.

Canada Office Action in related U.S. Appl. No. 18/168,902.

China Office Action in related U.S. Appl. No. 18/168,902.

International Preliminary Report on Patentability in related International Application No. PCT/US20223/062595, dated May 13, 2024, 7 pages.

* cited by examiner

500

Start

Receive signal from sensor —505

Detection profile set? —510

NO

YES

Apply detection profile to generate conditioned detection signal —515

Indication response profile set? —520

NO

YES

Determine indication —525

Change indication? —530

NO

YES

Generate control signal —535

Transmit control signal to indicator array —540

End

600

1100

1300

1305
Training
Input Data

1315
Detection
Signal

260
Detection Training Model

1310
Training
Output
Data

235
Indication
Response
Profile

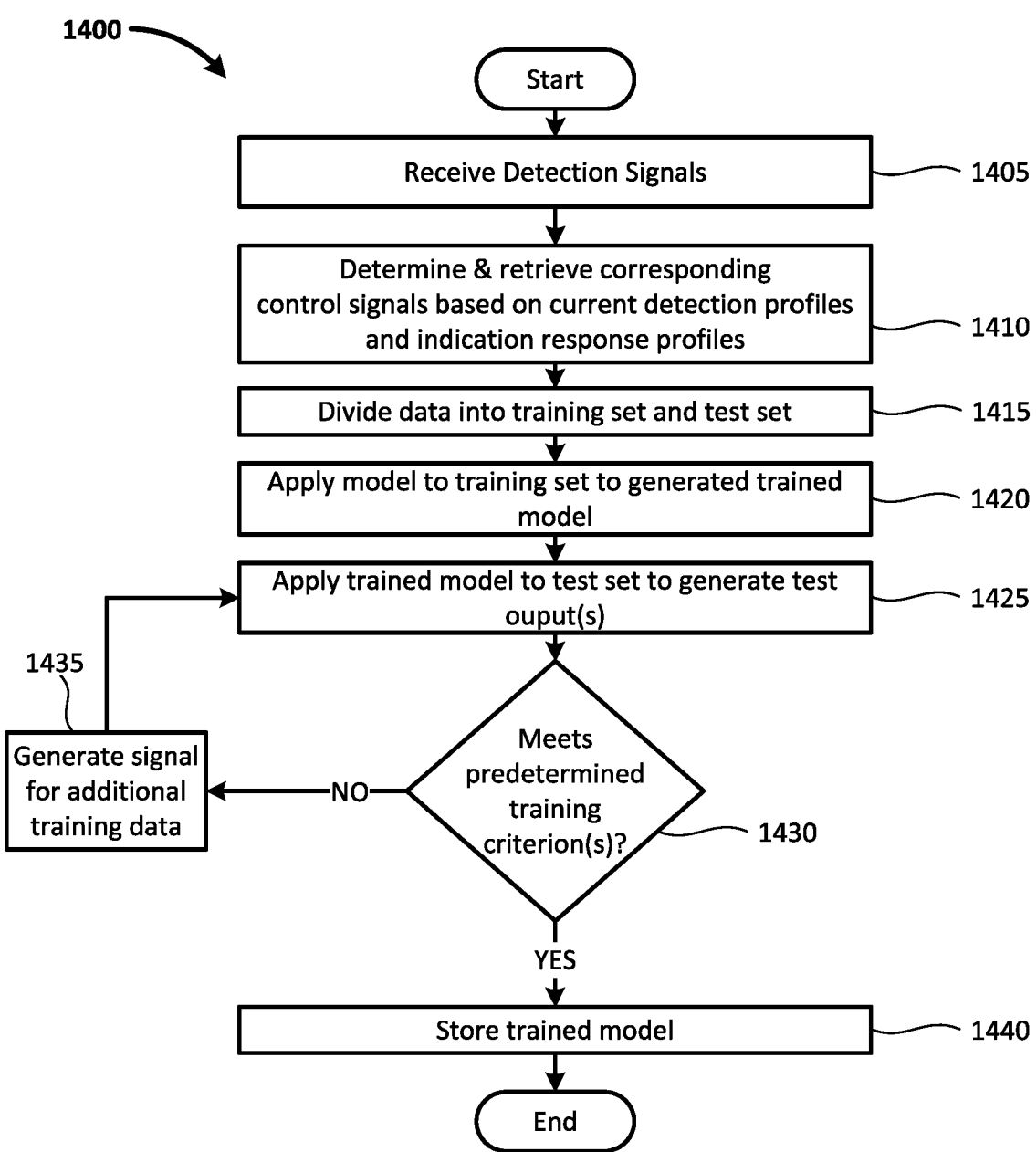

1400

Start

Receive Detection Signals —— 1405

Determine & retrieve corresponding
control signals based on current detection profiles
and indication response profiles —— 1410

Divide data into training set and test set —— 1415

Apply model to training set to generated trained
model —— 1420

Apply trained model to test set to generate test
ouput(s) —— 1425

1435

Generate signal
for additional
training data

Meets
predetermined
training
criterion(s)? —— 1430

NO

YES

Store trained model —— 1440

End

FIG. 14

SELF-CONTAINED RANGE DETECTION SYSTEMS WITH RECONFIGURABLE CHATTER-MITIGATED OUTPUT INDICATION

CROSS-REFERENCE TO RELATED APPLICATIONS

This application claims the benefit of U.S. Provisional Application Ser. No. 63/260,786, titled "Self-Contained Range Detection Systems with Reconfigurable Chatter-Mitigated Output Indication," filed by Chunmei Kang, et al., on Aug. 31, 2021.

This application incorporates the entire contents of the foregoing application(s) herein by reference.

The subject matter of this application may have common inventorship with and/or may be related to the subject matter of the following:

U.S. application Ser. No. 16/109,441, titled "Vibrational Alarms Facilitated by Determination of Motor On-Off State in Variable-Duty Multi-Motor Machines," filed by Robert T. Fayfield, et al., on Aug. 22, 2018, and issued as U.S. Pat. No. 11,002,634 on May 11, 2021;

U.S. application Ser. No. 15/808,531, titled "Augmented Sensing Tower Light Assembly," filed by Robert T. Fayfield on Nov. 9, 2017, and issued as U.S. Pat. No. 10,373,451 on Aug. 6, 2019;

U.S. application Ser. No. 16/447,332, titled "Augmented Sensing Tower Light Assembly," filed by Robert T. Fayfield on Jun. 20, 2019, and issued as U.S. Pat. No. 10,783,758 on Sep. 22, 2020;

U.S. application Ser. No. 63/158,697, titled "NON-CONTACT MOTION DETECTION SENSOR UTILIZING DISTANCE AND INTENSITY STATISTICS," filed by Wade Oberpriller, et al., on Mar. 9, 2021;

U.S. application Ser. No. 17/153,691, titled "DISTANCE SENSING AND VISUAL INDICATOR ARRAYS WITH RECONFIGURABLE DETECTION WINDOWS," filed by Charles Dolezalek on Jan. 20, 2021;

U.S. application Ser. No. 14/150,977, titled "Object Sensing Using Dynamic Threshold Hysteresis," filed by John Alyn Stecker on Jan. 9, 2014, and issued as U.S. Pat. No. 9,880,279 on Jan. 30, 2018;

U.S. application Ser. No. 17/301,632, titled "Vibrational Alarms Facilitated by Determination of Motor On-Off State in Variable-Duty Multi-Motor Machines," filed by Robert T. Fayfield, et al., on Apr. 9, 2021;

U.S. application Ser. No. 62/549,584, titled "Vibrational Alarms Facilitated by Determination of Motor On-Off State in Variable-Duty Multi-Motor Machines," filed by on Aug. 24, 2017;

U.S. application Ser. No. 17/036,255, titled "Near Range Radar," filed by Ashley Wise, et al., on Sep. 29, 2020; and U.S. application Ser. No. 62/924,025, titled "Near Range Radar," filed by Ashley Wise, et al., on Oct. 21, 2019.

This application incorporates the entire contents of the foregoing application(s) herein by reference.

TECHNICAL FIELD

Various embodiments relate generally to sensor-responsive indication.

BACKGROUND

Indicators may generate feedback. Feedback may, for example, be visual, audible, and/or tactile. Indicators may, for example, be responsive to wired and/or wireless inputs. Indicators may, for example, be provided with a control module configured to operate emitters (e.g., optical, haptic, audio). Some indicators may be configured to generate visual feedback. Visual feedback may, for example, include light. Indicators may, for example, include tower lights. Indicators may, for example, include ring lights. Indicators may, for example, include stick lights.

Sensors may respond to physical stimuli. For example, sensors may be configured to respond to distance. Sensors may, for example, be configured to respond to force, pressure, light, distance, or some combination thereof. Distance sensors may, by way of example and not limitation, include ultrasonic sensors, radar detectors, triangulation sensors, time of flight sensors, or some combination thereof.

SUMMARY

Apparatus and associated methods relate to detection systems with chatter-mitigated output indication. In an illustrative example, a sensor may generate a detection signal as a function of a physical relationship of a target to the sensor. A control circuit may, for example, generate a control signal in response to the detection signal and as a function of a predetermined indication response profile defining a transition threshold for each of multiple nominal transition points. A light-emitting indicator(s) may, for example, generate spatially distributed indication in response to the control signal. The indication may, for example, change from a first spatial distribution to a second spatial distribution in response to the detection signal crossing a first nominal transition point by at least a corresponding transition threshold ($\delta_{1i}$). Various embodiments may, for example, advantageously prevent the visual indication from responding to perturbations in the detection signal.

Various embodiments may achieve one or more advantages. For example, some embodiments may advantageously improve indication responses by updating the predetermined indication response profile using a machine learning algorithm. For example, some embodiments may advantageously attenuate undesired 'chattering' of visual indicia generated by a spatially distributed indicator array in response to perturbations of a detection signal. Some embodiments may, for example, advantageously prevent distracting and/or misleading feedback to an observer. A user may, for example, advantageously be enabled to have confidence in visual indication(s) generated as being an accurate indication and not a transitory 'chatter' of the signal due to perturbations in the detection signal(s).

In some embodiments a unitary structure CMDS may, for example, advantageously provide a user a single component to source, purchase, inventory, install, configure, and/or maintain. Various embodiments may, for example, advantageously achieve cost savings by reducing the number of processors. Some embodiments may, for example, achieve performance improvements by reducing data transfer. Some embodiments may, for example, advantageously reduce installation and/or configuration time and/or difficulty by providing a single configuration interface and/or process.

The details of various embodiments are set forth in the accompanying drawings and the description below. Other features and advantages will be apparent from the description and drawings, and from the claims.

BRIEF DESCRIPTION OF THE DRAWINGS

FIG. 14 depicts an exemplary method of training a detection training model.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a chatter-mitigated detection system (CMDS) is introduced with reference to FIGS. 1-2. Second, that introduction leads into a description with reference to FIGS. 3-4 of some exemplary embodiments of CMDSs. Third, with reference to FIGS. 5-9, methods of generating chatter-mitigated indication output are described. Fourth, this disclosure discusses, with reference to FIGS. 10-12, exemplary user interfaces for control and managing the CMDS. Fifth, with reference to FIGS. 13-14, exemplary methods of training the machine learning models are described. Finally, the document discusses further embodiments, exemplary applications and aspects relating to CMDSs.

Figure 1:
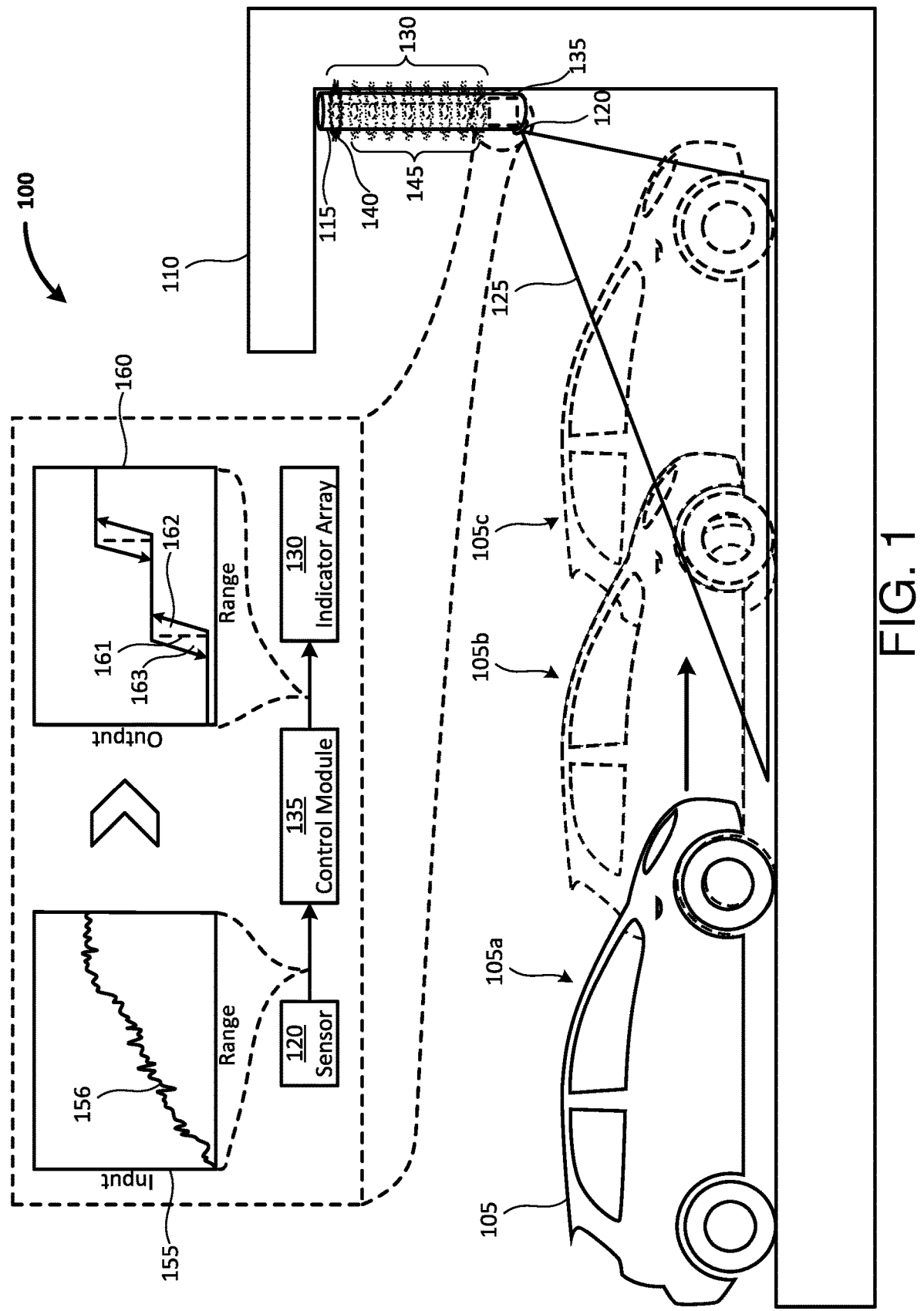
FIG. 1 depicts an exemplary chatter-mitigated detection system (CMDS) employed in an illustrative use-case scenario.

FIG. 1 depicts an exemplary chatter-mitigated detection system (CMDS) employed in an illustrative use-case scenario. In a depicted scenario 100, a vehicle 105 is approaching a parking space 110 defined by a wall. The parking space 110 is provided with a CMDS 115 (e.g., the CMDS 115 is affixed to a stationary object, such as directly to the wall). The CMDS 115 includes a sensor module 120. In the depicted example, the sensor module 120 is configured to emit a signal 125. The sensor module 120 is further configured to generate a detection signal in response to a received signal (e.g., a reflection of the emitted signal 125). In some embodiments the signal 125 may, by way of example and not limitation, include an electromagnetic signal. In various embodiments, the signal 125 may, for example, include other signal types (e.g., ultrasonic).

The CMDS 115 further includes a spatially distributed indicator array 130. For example, the spatially distributed indicator array 130 may include an array of emitters (e.g., light emitting diodes (LEDs)). The emitters may, for example, be distributed along at least one one-dimensional axis, two-dimensional plane, and/or three-dimensional surface.

The spatially distributed indicator array 130 is operably coupled (e.g., electromagnetically, electrically, mechanically) to a control module 135. The control module 135 may, for example, generate one or more control signals. The spatially distributed indicator array 130 may, for example, generate a spatially distributed visual indication in response to the control signal(s).

The sensor module 120 is operably coupled (e.g., electromagnetically, electrically, mechanically) to the control module 135. The control module 135 may, for example, generate a control signal(s) as a function of the detection signal(s) received from the sensor module 120. Accordingly, the spatially distributed indicator array 130 may, for example, generate the spatially distributed visual indication based on the detection signal(s).

As depicted, the vehicle 105 begins in a first position 105*a*. In the first position 105*a*, the vehicle 105 is not within a detection field defined by the emitted signal 125. The CMDS 115 may be configured, for example, to generate an indication indicating that the parking space 110 is empty. For example, the sensor module 120 may receive none or very low intensity of reflection of the emitted signal 125 when the vehicle 105 is in the first position 105*a*. The control module 135 may, for example, generate a first control signal in response to a detection signal (or, for example, lack thereof) corresponding to no detected vehicle. The spatially distributed indicator array 130 may, for example, generate a first visual indication 140 in response to the first control signal. As depicted, the first visual indication 140 corresponds to an activation of an uppermost emitter element of the spatially distributed indicator array 130.

In some embodiments, the first visual indication 140 may, by way of example and not limitation, be emitted in a predetermined spectrum (e.g., wavelengths corresponding to green visible light). The predetermined spectrum may, for example, be emitted according to the control signal. The control signal may, for example, be generated according to a predetermined indication response profile (IRP) associating a spectral band with the (conditioned) detection signal.

As the vehicle 105 moves forward towards the parking space 110, the vehicle 105 travels from a first position 105*a* to a second position 105*b*. In the second position 105*b*, the vehicle 105 is within the detection field defined by the emitted signal 125. Accordingly, the emitted signal 125 may be reflected off the vehicle 105. The sensor module 120 may receive at least some of the reflected signal. The sensor module 120 may generate a second detection signal in response to the received reflected signal. The control module 135 may generate a second control signal in response to and as a function of the second detection signal. The second control signal may, for example, be generated based on the indication response profile. The spatially distributed indicator array 130 may generate a second visual indication in response to the second control signal.

A spatial distribution of the second visual indication may be different in a spatial distribution of the first visual indication 140. For example, at least one lower emitter element of the spatially distributed indicator array 130 may be activated. In various embodiments, a number of emitter elements activated may, by way of example and not limitation, be determined as a function of distance from the vehicle 105 to the sensor module 120. In various embodiments, an emitted spectrum of one or more activated emitter elements may, by way of example and not limitation, be determined as a function of distance from the vehicle 105 to the sensor module 120.

As the vehicle 105 continues to move forward from the second position 105b to a third position 105c, the vehicle 105 moves further into the detection field defined by the emitted signal 125. The detection signal generated by the sensor module 120 may vary proportionally. The control module 135 may vary the control signal proportionally to the change in the detection signal. The spatially distributed indicator array 130 may generate spatially distributed visual indication with corresponding changes (e.g., in spatial distribution, in spectral distribution).

As depicted, when the vehicle 105 reaches the third position 105c, a nose of the vehicle 105 has extended closer to the wall defining the parking space 110 than the detection field defined by the emitted signal 125. As the vehicle 105 reaches the edge of the detection field closest to the wall, the sensor module 120 may, for example, generate a third detection signal corresponding to the vehicle 105 having reached the extent of the detection field. The control module 135 may, for example, generate a third control signal in response to the third detection signal. The third control signal may, for example, be generated based on the indication response profile. The spatially distributed indicator array 130 may, for example, generate a third visual indication 145 corresponding to the third control signal. The third visual indication 145 may indicate to a driver of the vehicle 105 that the vehicle 105 is fully positioned in the parking space 110. As depicted, the third visual indication 145 corresponds to activation of all emitter elements of the spatially distributed indicator array 130 other than the topmost one. The third visual indication 145 may, for example, further include a different emitted spectrum of at least one emitter element. A spectrum emitted by the uppermost emitter element may, by way of example and not limitation, be changed such that the uppermost emitter element changes from green to red (e.g., indicating to stop). The spectrum emitted by other emitter elements of the spatially distributed indicator array 130 may, for example, correspond to one or more distance thresholds.

In some embodiments, the emitted spectrum(s) may, for example, be spatially distributed. In some embodiments, by way of example and not limitation, the lowermost elements may be yellow, intermediate elements may be orange, and the uppermost element(s) may be red. In some embodiments, a spectrum of each element may, for example, be incremented from a previous emitter element as each emitter element is progressively activated in response to a decreasing distance between the vehicle 105 and the sensor module 120. Accordingly, a driver may, for example, receive visual guidance of a position of the vehicle 105 relative to a target position in the parking space 110.

In some embodiments, the detection signal may vary non-monotonically with a monotonically varying range of a detected object. For example, the detection signal generated by the sensor module 120 may vary non-monotonically even as the range of the vehicle 105 from the sensor module 120 is monotonically decreasing. By way of example and not limitation, the detection signal may vary based on the geometry of the vehicle 105 (e.g., in response to the windshield wipers, license plate, driver, hood shape). The detection signal may, for example, vary based on other objects (e.g., transitory objects such as an insect or bird flying between the vehicle 105 and the sensor module 120). The detection signal may, for example, vary based on disturbances to the emitter and/or receiver of the sensor module 120 (e.g., electrical disturbances, mechanical disturbances such as vibration).

In various embodiments, conditioning may be applied to the detection signal by the sensor module 120 and/or the control module 135. The conditioning may, for example, be analog and/or digital. A conditioned detection signal may, for example, be generated based on a (predetermined) detection profile. An IRP may, for example, include at least one detection profile. Response of the conditioned detection signal and/or the control signal to perturbations in the (raw) detection signal may, for example, be determined as a function of the IRP(s) and/or detection profile(s). Accordingly, undesired 'chattering' of the visual indica generated by the spatially distributed indicator array 130 in response to perturbations of the detection signal may be advantageously attenuated.

In the depicted example, a plot 155 depicts an exemplary (raw) detection signal 156 generated by the sensor module 120 in response to the approaching (decreasing range) vehicle 105. As depicted, the detection signal 156 trends generally upward (increasing signal, such as amplitude) as range decreases (with zero at the right of the horizontal axis). However, as shown, the detection signal 156 includes significant local perturbations. The control module 135 (e.g., a processor) generates a control signal in response. The control module 135 may, for example, apply at least one detection profile and/or IRP to the detection signal 156 to generate a "smoothed" output. The smoothed control signal may be sufficient to generate desired visual indication while mitigating chatter.

A plot 160 depicts an exemplary control signal generated by the control module 135 in response to the detection signal 156. The control signal includes a nominal transition threshold 161 at which range the output (e.g., amplitude, value) of the output changes. The control signal may, for example, be configured to change a spatial distribution of the spatially distributed indicator array 130 (e.g., to activate an additional emitter element as range increases). As the range decreases (with the right of the horizontal axis of the plot 160 corresponding to zero), the range crosses the nominal transition threshold 161. However, the output does not immediately change in response. The range must decrease to a first transition range threshold 162 before the output changes. If the range, for example, increases again (e.g., the vehicle 105 reverses), the range must increase to a second transition range threshold 163 before the output decreases in response.

Accordingly, based on the IRP, perturbations in the control signal may be attenuated. Chatter in the spatially distributed indicator array 130 (e.g., a blinking light due to perturbances in the detection signal 156) may thereby be advantageously mitigated. Such embodiments may, for example, advantageously prevent distracting and/or misleading feedback to an observer (e.g., an emitting element being deactivated temporarily as the vehicle 105 approaches due to a perturbance in the detection signal but giving an appearance of increased range to the driver).

Figure 2:
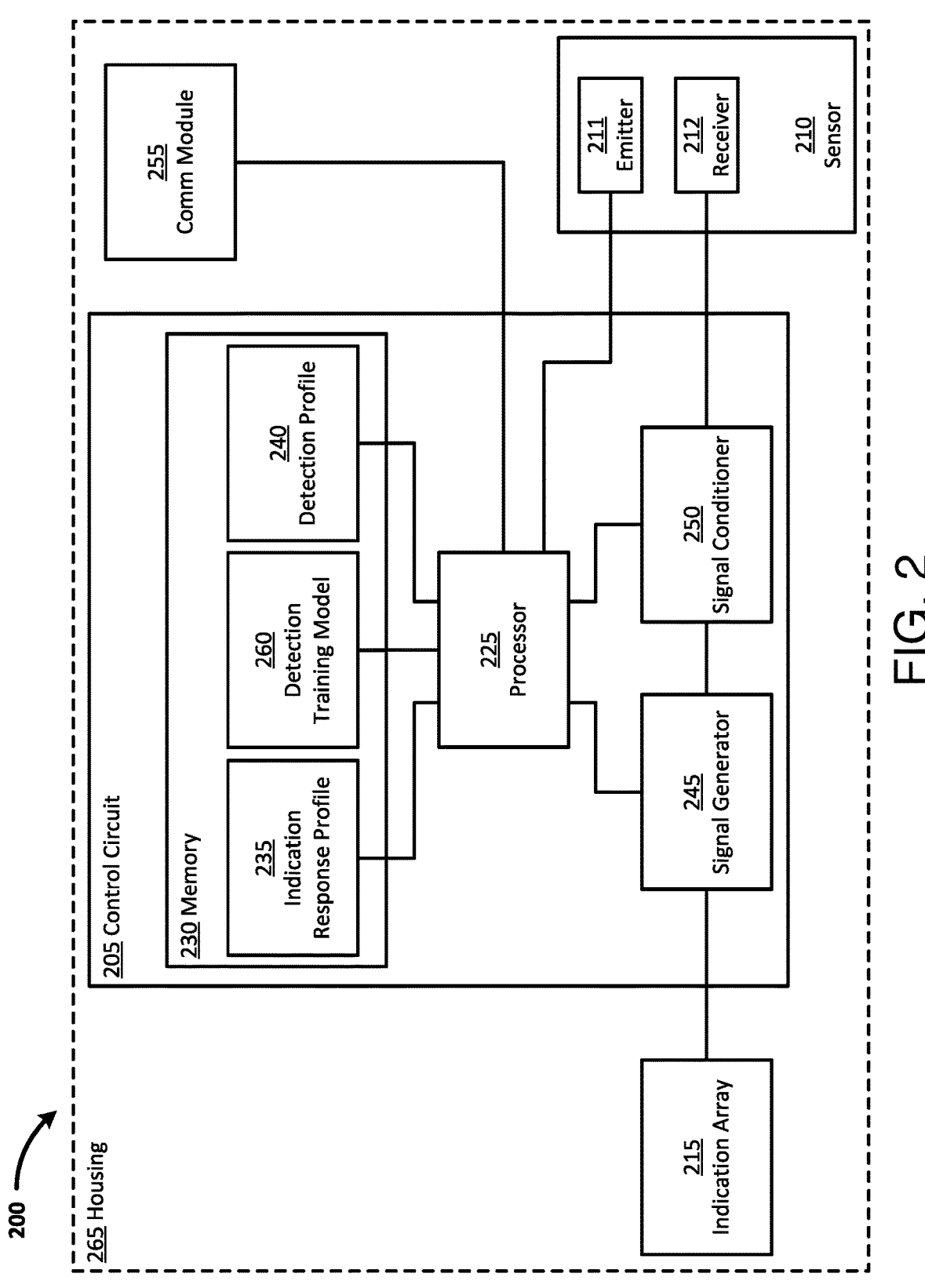
FIG. 2 depicts an exemplary block diagram for an exemplary CMDS.

FIG. 2 depicts an exemplary block diagram for an exemplary CMDS. In the depicted example, a CMDS 200 includes a control circuit 205 (e.g., such as control module 135 disclosed at least with reference to FIG. 1). The control circuit 205 is operably coupled to a sensor circuit 210 (e.g., such as sensor module 120 disclosed at least with reference to FIG. 1). The control circuit 205 is further coupled to an indication array 215 (e.g., such as spatially distributed indicator array 130 disclosed at least with reference to FIG. 1).

In the depicted example, the sensor circuit 210 is provided with an emitter 211. The emitter 211 may, for example, be configured to launch a signal (e.g., an electromagnetic signal). The emitter 211 may, for example, include an optical emitter (e.g., laser, photodiode). The emitter 211 may, for example, include an audio emitter. The emitter 211 may, for example, include an ultrasonic emitter. In some embodiments the emitter 211 may, for example, be omitted.

The sensor circuit 210 is further provided with a receiver 212. The receiver 212 may, for example, include an optical sensor. The optical sensor may, for example, include a single optical sensing cell. The optical sensor may, for example, include a 1-dimensional array of optically responsive pixels. The optical sensor may, for example, include a multi-dimensional array of optically responsive pixels. The receiver may, for example, include an audio transducer. The receiver may, for example, include a temperature transducer. The receiver may, for example, include an ultrasonic transducer. The receiver may, for example, include a force transducer. The receiver may, for example, include an analytic sensor (e.g., gas sensor, particle sensor, smoke sensor, chemistry-responsive sensor).

The emitter 211 may, for example, generate a signal (e.g., emitted signal 125 as disclosed at least with reference to FIG. 1, electromagnetic signal, sonic signal, pressure signal). The receiver 212 may, for example, be configured to receive a (reflected) signal, such as a reflection of the signal generated by the emitter 211. The receiver 212 may generate a detection signal in response to the received signal.

The control circuit 205 is provided with a processor 225. The processor 225 is operably coupled to a memory module 230. The memory module 230 may, by way of example and not limitation, include non-volatile and/or random-access memory modules. In the depicted example, the memory module 230 includes an indication response profile (IRP 235) and a detection profile 240. The IRP 235 and/or the detection profile 240 may, for example, be predetermined (e.g., by a designer, installer, operator, factory) and stored on the memory module 230.

The receiver 212 is operably coupled to the signal conditioner module 250 of the control circuit 205. The signal conditioner module 250 may, for example, receive the detection signal generated by the receiver 212. The processor 225 is operably coupled to a signal conditioner module 250. The signal conditioner module 250 may, for example, apply the detection profile 240 to the detection signal from the receiver 212. The signal conditioner module 250 may generate a conditioned signal.

The signal conditioner module 250 is operably coupled to a signal generator module 245. The signal generator module is further operably coupled to the processor 225. The signal generator module 245 may, for example, apply the IRP 235 to the conditioned signal. The signal generator module 245 may generate a control signal as a function of the IRP 235 and the conditioned signal.

The signal generator module 245 is operably coupled to the indication array 215. The indication array 215 may, for example, receive the control signal. The indication array 215 may generate at least one visual indication in response to the control signal. The at least one visual indication may, by way of example and not limitation, be spatially distributed. The at least one visual indication may, by way of example and not limitation, be spectrally distributed. In some embodiments the at least one visual indication may, by way of example and not limitation, the spectral distribution may be spatially distributed (e.g., the spectral distribution may vary as a function of spatial distribution). Accordingly, in various embodiments the CMDS 200 may provide chatter-mitigated visual indication generated as a function of the detection signal, the detection profile 240, and/or the IRP 235.

The processor 225 is operably coupled to a communication module 255 (labeled "Comm Module"). The processor 225 may, for example, receive inputs through and/or transmit outputs through the communication module 255. The communication module 255 may, for example, include wireless and/or wired communication circuits and/or ports. For example, the communication module 255 may provide wired communication (e.g., via RJ45, IO-Link, serial, HDMI, USB), near-field wireless communication (e.g., Bluetooth), wireless communication (e.g., Wi-Fi), or some combination thereof. The communication module 255 may, for example, communicate with one or more human-machine interface (HMI). The communication module 255 may, for example, communicate with a stationary computing device (e.g., desktop workstation, server), a portable computing device (e.g., smartphone, tablet, laptop), or some combination thereof.

The processor 225 is operably coupled to, in this example, a detection training model (DTM 260). For example, the DTM 260 may train the predetermined IRP as a function of user input and the detection signal. In some implementations, a user may adjust a control signal output according to specific scenarios. For example, to protect the vehicle 105, the user may require the CMDS to have a higher sensitivity when the vehicle 105 is within the third position 105*c*. In some implementations, the DTM 260 may combine the user input and historical detection signals to generate updated IRPs. For example, the DTM 260 may apply regressions, classifications, and/or other supervised machine learning algorithms to train the IRPs according to user inputs.

As depicted, the CMDS 200 is further provided with a housing 265. In the depicted example, the housing 265 encompasses the control circuit 205, the sensor circuit 210, the indication array 215, and the communication module 255. In some embodiments the housing 265 may, for example, be a unitary housing mechanically coupling the sensor circuit 210, the control circuit 205, the indication array 215, and/or the communication module 255. For example, the housing 265 may mechanically house the CMDS 200 as a single unit for a user to manipulate. The housing 265 may, for example, include mounting elements and/or features (e.g., mounting hole, mounting bracket, magnetic element, mounting hook). A unitary CMDS 200 structure at least partially outwardly defined by the housing 265 may, for example, advantageously provide a user (e.g., technician, inventory worker, engineer, purchasing manager) a single component to source, purchase, inventory, install, configure, and/or maintain. A CMDS may, for example, be advantageously affixed to an object(s) via the housing 265. For example, the CMDS may be (releasably) coupled to a stationary object. The CMDS may, for example, be coupled to a portable object. The CMDS may, for example, be configured to operate when the portable object is in a stationary position.

In some embodiments, indication logic may, for example, be at least partially embodied locally on a single (e.g., unitary) device (e.g., CMDS). A controller (e.g., control circuit 205) may, for example, be disposed in a single device (e.g., in the housing 265) with at least one sensor and at least one indicator array. In some embodiments, for example, a single controller may process the output of a sensor(s) (e.g., sensor circuit 210) in response to a detected signal and may control output of an indicator (e.g., indication array 215) in response. Accordingly, various embodiments may, by way of example and not limitation, advantageously reduce traffic between the controller and the sensor, the controller and the indicator array, or some combination thereof. Various embodiments may, for example, advantageously decrease latency, decrease response time, or some combination thereof.

In some embodiments a unitary CMDS may, for example, be configured to change an indication in response to a sensor signal as a function of an indication profile (e.g., a threshold is met) without intervention from a controller external to the CMDS. Accordingly, various embodiments may advantageously reduce signal traffic to and/or from a remote controller (e.g., a programmable logic controller (PLC), a server, an industrial controller). For example, at least one remote controller may be positioned at a distance away from a (unitary) CMDS (e.g., defined by the housing 265). A CMDS with an internal controller may, for example, be deployed which generates an indication(s) in response to an onboard sensor(s) without requiring communication with the remote controller.

Figure 3:
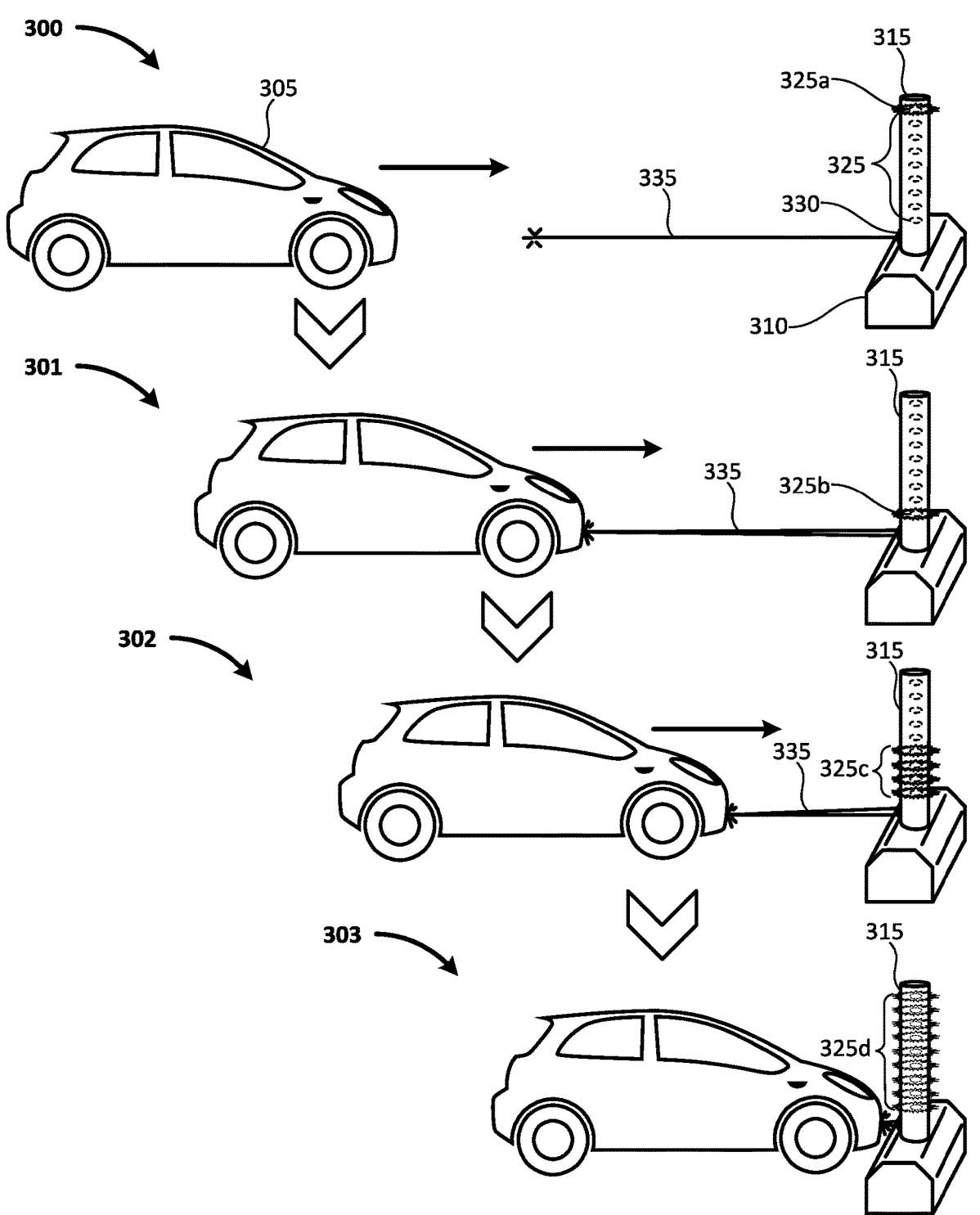
FIG. 3 depicts an exemplary CMDS employed in an illustrative use-case scenario related to parking assistance.

FIG. 3 depicts an exemplary CMDS employed in an illustrative use-case scenario related to parking assistance. In a first exemplary scenario 300, a vehicle 305 is approaching a parking space at least partially defined by a parking boundary element 310. The parking boundary element 310 is provided with a CMDS 315. The CMDS 315 is provided with an indicator array 325. The CMDS 315 is further provided with a sensor module 330. The sensor module 330 is emitting a signal 335 (e.g., laser beam, ultrasound signal). The sensor module 330 may be configured to receive a (reflection of the) signal.

In the first exemplary scenario 300, the vehicle 305 is out of range of the signal 335. The signal 335 may, for example, not reach the vehicle 305. A reflection of the signal 335 may, for example, not reach the sensor module 330. A (predetermined) threshold (e.g., range, intensity, frequency, amplitude) may, for example, not have been reached. Accordingly, the CMDS 315 may, for example, determine that the parking space is unoccupied. The CMDS 315 generates a first visual indication 325a in response to a first detection signal from the sensor module 330. The detection signal may, by way of example and not limitation, include a lack of signal.

A control module (not shown) may generate a first indication signal(s) in response to the first detection signal. The first indication signal may, for example, be generated as a function of at least one (predetermined) IRP and/or (predetermined) detection profile. For example, a detection profile may be applied to the (raw) detection signal to generate a conditioned detection signal. The IRP may, for example, be applied to the conditioned detection signal. In some embodiments the detection profile may be part of the IRP. The IRP may, for example, be applied to a raw or preconditioned detection signal (e.g., preconditioned by on-board circuitry in the sensor module 330).

The indicator array 325 generates the first visual indication 325a in response to the first control signal. The first visual indication 325a may, for example, be generated as function of the IRP. As depicted, the first visual indication 325a is a top-most emitter of the indicator array 325. The first visual indication 325a may, for example, include a specific color (e.g., green, red, blue). The first visual indication 325a may, for example, include a (predetermined) activity pattern and/or sequence. For example, the first visual indication 325a may be blinking green, solid blue, or some combination thereof. The first visual indication 325a may, for example, be configured to indicate to a user that the parking space is available.

In a second exemplary scenario 301, the vehicle 305 has traveled closer to the CMDS 315. For example, the vehicle 305 has entered the parking space defined by the parking boundary element 310. The signal 335 is reflected off a front of the vehicle 305. Accordingly, the sensor module 330 may detect a reflection of the signal 335. The sensor module 330 may generate a second detection signal in response to the reflection of the signal 335. The control module may generate a second control signal in response to the second detection signal.

The indicator array 325 generates a second visual indication 325b in response to the second control signal. The second visual indication 325b, as depicted, includes activation of a lower emitter of the indicator array 325. The second visual indication 325b may, for example, include a (predetermined) color and/or activity pattern. For example, the second visual indication 325b may be colored green. The second visual indication 325b may, for example, not include activation of the upper emitter element as in first visual indication 325a. The second control signal may, for example, be configured to cause the indicator array 325 to deactivate the upper emitter element. Accordingly, a driver of the vehicle 305 may be (visually) notified that the vehicle 305 has entered the parking space and is detected by the CMDS 315. Other drivers may, for example, be notified that the parking space defined by the parking boundary element 310 is not available.

In a third exemplary scenario 302, the vehicle 305 has more fully entered the parking space. The sensor module 330 may, for example, generate a third detection signal indicative of a decreased range between the sensor module 330 and the vehicle 305 relative to the second exemplary scenario 301. The control module may generate a third control signal in response to the third detection signal. The indicator array 325 generates a third visual indication 325c. For example, the third visual indication 325c may be generated in response to the third control signal. The third visual indication 325c is at least partially generated, as depicted, by activation of additional emitter elements of the indicator array 325. Accordingly, the spatial distribution of the visual indication is changed in response to approach of the vehicle 305. The driver of the vehicle 305 may, for example, be advantageously notified of progress in approaching a parked position.

The spectral distribution of the visual indication may, for example, be changed from the second visual indication 325b to the third visual indication 325c. For example, the third visual indication 325c may include multiple colors. For example, a lower (activated) emitter may be yellow. An upper (activated) emitter element may be orange, for example. In some embodiments each activated emitter element may be incrementally spatially shifted from the (spatially) previous (e.g., lower) emitter element. Some such embodiments may, for example, appear to the driver of the vehicle 305 and/or another observer to have a substantially continuous spectral gradient from one color (e.g., yellow) to another color (e.g., orange). In some embodiments the IRP may, for example, specify a beginning and/or ending spectral band. The control module may, for example, dynamically determine a spectral band of each emitter to (smoothly) transition from the beginning spectral band to the ending spectral band.

In a fourth exemplary scenario 303, the vehicle 305 is in a parked position relative to the parking boundary element 310. The sensor module 330 may, for example, generate a fourth detection signal indicative of a decreased range between the sensor module 330 and the vehicle 305 relative to the third exemplary scenario 302. The control module may generate a fourth control signal in response to the fourth detection signal. For example, the control module may determine (e.g., as a function of the IRP) that the fourth detection signal corresponds to a (predetermined) range associated with a parked position in the parking space. The indicator array 325 generates a fourth visual indication 325d. For example, the fourth visual indication 325d may be generated in response to the fourth control signal. The fourth visual indication 325d is at least partially generated, as depicted, by activation of all emitter elements of the indicator array 325. Accordingly, the spatial distribution of the visual indication is changed in response to arrival of the vehicle 305 in a parked position. Accordingly, the driver may, for example, be advantageously notified when the vehicle 305 is in a parked position.

The spectral distribution of the visual indication may, for example, be changed from the third visual indication 325c to the fourth visual indication 325d. For example, the fourth visual indication 325d may be a solid color (e.g., green, red). In some embodiments the fourth visual indication 325d may, for example, include multiple colors. For example, a lower (activated) emitter may be yellow. A middle (activated) emitter element may be orange, for example. An upper (activated) emitter element may, for example, be red. In some embodiments each activated emitter element may be incrementally spatially shifted from the (spatially) previous (e.g., lower) emitter element. Some such embodiments may, for example, appear to the driver of the vehicle 305 and/or another observer to have a substantially continuous spectral gradient from one color (e.g., yellow) to another color (e.g., red). In some embodiments the IRP may, for example, specify a beginning and/or ending spectral band. In some embodiments the IRP may, for example, specify that upon reaching a predetermined threshold and/or criterion (e.g., corresponding to a parked position) some or all emitter elements change color (e.g., to red, to green). In some embodiments the IRP may, for example, specify that upon reaching the predetermined threshold and/or criterion that the fourth visual indication 325d include a display sequence and/or pattern. For example, the fourth visual indication 325d may be blinking. The fourth visual indication 325d may, for example, include a sequential activation and/or deactivation of emitter elements of the indicator array 325. In an exemplary embodiment, by way of example and not limitation, the emitter elements may be operated such that a predetermined color(s) (e.g., green) "race" up the CMDS 315 and then blink (e.g., twice) before providing a solid indication.

In some embodiments a fifth visual indication may be generated (e.g., after a predetermined period of time that the vehicle 305 has been parked). The fifth visual indication may, for example, include the uppermost element (e.g., such as in first visual indication 325a) being activated. The fifth visual indication may, for example, include a different spectral band than the first visual indication 325a. The fifth visual indication may, for example, be red (e.g., instead of green). The fifth visual indication may advantageously, for example, indicate to a viewer (e.g., another driver) that the vehicle 305 is parked in the parking space.

Figure 4:
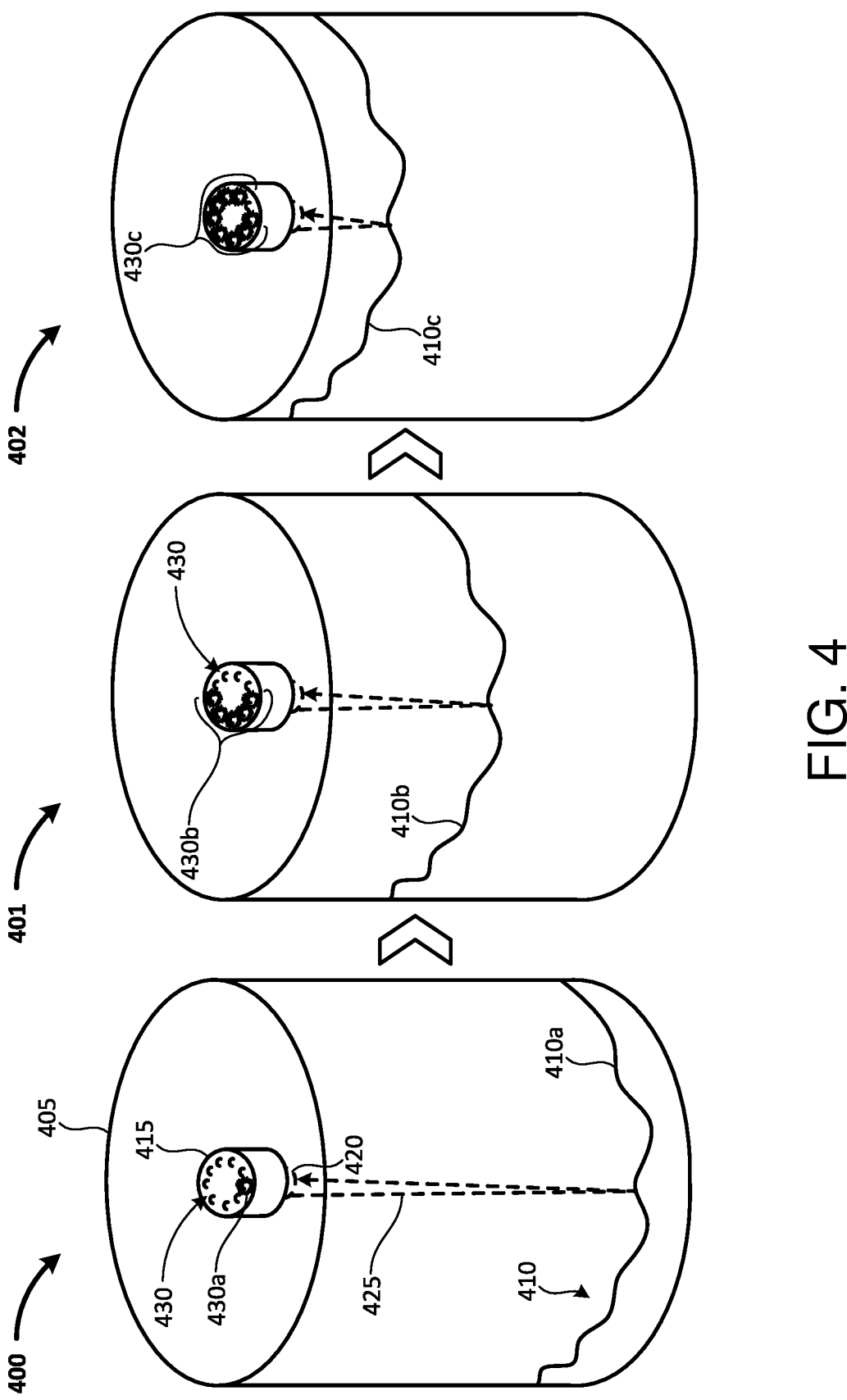
FIG. 4 depicts an exemplary CMDS employed in an illustrative use-case scenario related to container contents monitoring.

FIG. 4 depicts an exemplary CMDS employed in an illustrative use-case scenario related to container contents monitoring. In a first exemplary scenario 400, a tank 405 has contents 410 disposed within it at a first level 410a. A CMDS 415 is disposed at a top end of the tank 405. The CMDS 415 is provided with a sensor module 420. The sensor module 420 may, for example, be configured to generate one or more detection signals in response to a detected distance. The sensor module may, by way of example and not limitation, include a laser distance sensor, ultrasonic distance sensor, time of flight sensor, radar sensor, triangulation sensor, or some combination thereof.

As depicted, the sensor module 420 emits a signal 425. The sensor module 420 may, for example, include a radar sensor. The signal 425 (e.g., an electromagnetic signal, such as radar) at least partially reflects off the contents 410. At least a portion of the reflected signal is detected by the sensor module 420. The sensor module 420 may generate a detection signal in response. A control module (not shown) may generate a control signal in response to the detection signal. The control signal may, for example, be generated as a function of an IRP, a detection profile, or some combination thereof.

The CMDS 415 is provided with an indicator array 430. The indicator array 430, as depicted, includes a (substantially) circular array of emitter elements. In some embodiments the indicator array may, for example, include a (substantially) linear array of emitter elements (not shown). The CMDS 415 generates a first visual indication 430a. For example, the first visual indication 430a may be generated in response to the control signal. The first visual indication 430a may, for example, be generated (e.g., indirectly via the sensor module 420, the signal 425, and/or the control module) as a function of the first level 410a of the contents 410 in the tank 405. For example, a spatial and/or spectral distribution of the first visual indication 430a may be configured (e.g., by the IRP) to correspond to the first level 410a. Accordingly, a viewer may, for example, advantageously quickly determine a level of the contents of the contents 410 of the tank 405 by glancing at the CMDS 415.

In a second exemplary scenario 401, the contents 410 have reached a second level 410b. The sensor module 420 may generate a second detection signal in response to the (reflected) signal from the (emitted) signal 425. The control module may generate a second control signal in response to the second detection signal. The indicator array 430 generates a second visual indication 430b. The second visual indication 430b may, for example, be generated by the indicator array 430 in response to the second control signal. As depicted, the spatial distribution of the second visual indication 430b is altered relative to the first visual indication 430a (e.g., additional emitter elements are activated). The second visual indication 430b may, for example, be operated to create a 'dial' and/or 'gauge' visual indication. The visual indication may, for example, be readily understood by a viewer as corresponding to a level of the contents 410. Accordingly, a user may, for example, quickly and efficiently determine a level of the contents 410 by glancing at the CMDS 415.

In a third exemplary scenario 402, the contents 410 have reached a third level 410c. The sensor module 420 may generate a third detection signal in response to the (reflected) signal from the (emitted) signal 425. The control module may generate a second control signal in response to the second detection signal. The indicator array 430 generates a third visual indication 430c. The third visual indication 430c may, for example, be generated by the indicator array 430 in response to the second control signal. As depicted, the spatial distribution of the second visual indication 430b is altered relative to the second visual indication 430b (e.g., additional emitter elements are activated).

In some embodiments the spectral distribution may be configured, by way of example and not limitation, such that a color(s) emitted by the indicator array 430 correspond to a required action. For example, the first visual indication 430a may be green. The second visual indication 430b may, for example, be at least partially yellow. The third visual indication 430c may, for example, be at least partially red. In some embodiments a fourth visual indication (not shown) may, for example, be generated upon the contents 410 reaching a fourth level (not shown) in the tank 405. For example, the fourth visual indication may be generated according to a (predetermined) time distribution. For example, the fourth visual indication may be blinking. In some embodiments a visual indication may, for example, include time-, spectral-, and/or spatial-distributions such as flashing lights, racing lights, strobing lights, pulsing lights, or some combination thereof. In some embodiments audio and/or haptic signals may be generated (e.g., according to at least one IRP).

In some embodiments the visual indication generated by the CMDS 415 may further indicate an acceptable level of the contents 410 in the tank 405. For example, a (predetermined) IRP may be set so that the first level 410a is indicated as being acceptable. The second level 410b may, for example, be indicated as approaching a required action. The third level 410c may, for example, be indicated as requiring urgent action (e.g., shutting of an inlet, switching to another tank, disposing of the contents 410). In various embodiments the tank 405 may, by way of example and not limitation, be a sewer tank and the contents 410 may be waste products. In some embodiments the tank 405 may, for example, be a grain bin and the contents 410 may be grain (e.g., corn, wheat, millet, pelleted feed).

In some embodiments the tank 405 may, for example, be a rainwater collection tank and the contents 410 may be collected rainwater. In some embodiments the CMDS 415 may, by way of example and not limitation, be further configured to monitor additional physical attributes of the contents 410. For example, in the illustrative example of the rainwater collection tank. The CMDS 415 may, by way of example and not limitation, be provided with a color detector and/or transparency detector (e.g., optical sensor). The indicator array 430 may, for example, be at least partially operated in response to a color of the contents 410 (e.g., collected rainwater). For example, if the contents 410 becomes murky and/or changes to a color (e.g., green) indicative of stagnation and/or undesired growth (e.g., algae, bacteria, aquatic life), the indicator array 430 may be operated to generate at least one visual indication having a spatial, spectral, and/or time distribution corresponding to required action (e.g., draining, cleaning, and/or treating the contents 410 of the tank 405).

In some embodiments contents may, for example, include gaseous elements (e.g., non-solid contents). In some embodiments presence of physical phenomena may, for example, be monitored and/or indicated. Physical phenomena may, for example, include humidity, temperature, analytes, or some combination thereof. In various embodiments a sensor module may be configured to generate signal(s) in response to one or more such physical phenomena. The indicator array may be configured to generate output indication in response.

Figure 5:
FIG. 5 depicts a flowchart of an exemplary method for generating an indication output.

FIG. 5 depicts a flowchart of an exemplary method for generating an indication output. In a method 500, a signal is received from a sensor in a step 505. The sensor may, for example, be part of a CMDS. The sensor may include at least some portion of a sensor module such as, by way of example and not limitation, sensor module 120, sensor circuit 210, sensor module 330, and/or sensor module 420 such as disclosed at least with reference to FIGS. 1-4. The signal may include, for example at least one detection signal. The signal may, for example, include a raw detection signal. The signal may, for example, include a pre-conditioned detection signal. In various embodiments the method 500 may, by way of example and not limitation, be at least partially performed by a controller (e.g., control module 135 and/or control circuit 205 as disclosed at least with reference to FIGS. 1-2).

If a detection profile is determined to be set in a decision point 510, then the detection profile is applied (e.g., after retrieval from a datastore such as disclosed at least with reference to FIG. 2) in a step 515. If an indication response profile (IRP) is determined to be set in a decision point 520, then an indication is determined in a step 525, as a function of the IRP. The indication may, for example, be determined as a control signal. The indication may, for example, correspond to at least one visual indication. In the method 500, the decision point 520 may be reached directly from the decision point 510 if the detection profile was determined to not be set.

If a current indication (e.g., current visual indication) is determined in a decision point 530 to not be changed by the (planned) indication determined in the step 525, then the method ends in the depicted example. In some embodiments, the decision point 530 may, for example, be omitted (e.g., a control signal may be generated regardless). In some embodiments the step 525 may, for example, be omitted (e.g., the control signal may be generated without an intermediate step of determining an indication corresponding to the conditioned detection signal as a function of the IRP).

If the current indication is determined in the decision point 530 to be changed by the indication determined in the step 525, then a (corresponding) control signal is generated in a step 535. The control signal may be generated in response to the conditioned detection signal generated in the step 515 and/or the indication determined in the step 525. The generated control signal is then transmitted to an indicator array (e.g., spatially distributed indicator array 130, indication array 215, indicator array 325, and/or indicator array 430 such as disclosed at least with reference to FIGS. 1-4) in a step 540. The indicator array may, for example, generate at least one visual indication in response to the control signal. The control signal may, for example, include one or more individual signal and/or signal components (e.g., analog and/or digital). The exemplary method 500 ends.

Figure 6:
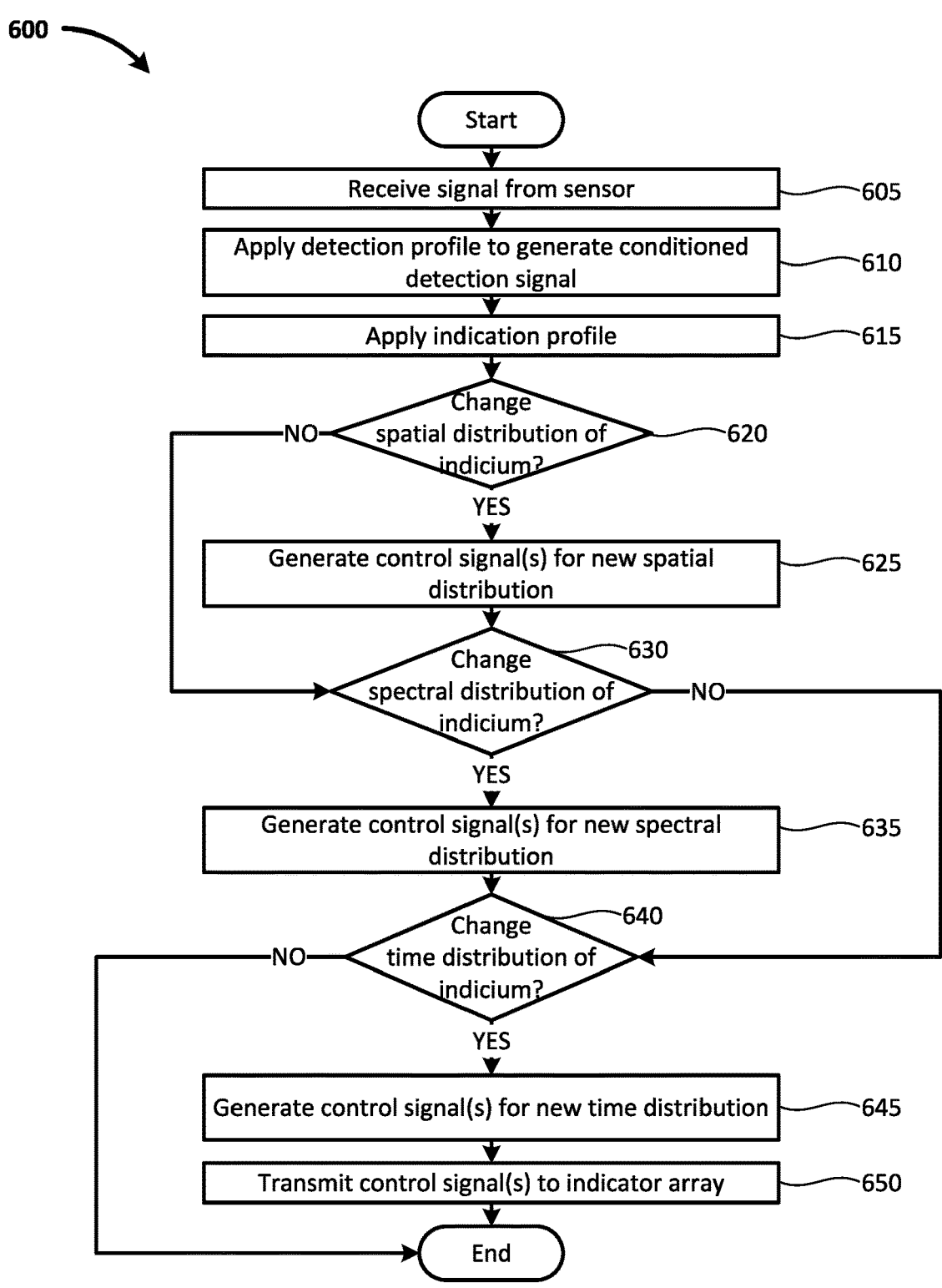
FIG. 6 depicts a flowchart of an exemplary method for generating a range indication output that is spatially and spectrally distributed.

FIG. 6 depicts a flowchart of an exemplary method for generating a range indication output that is spatially and spectrally distributed. In a method 600, a signal is received from a sensor in a step 605. The sensor may, for example, be part of a CMDS. The sensor may include at least some portion of a sensor module such as, by way of example and not limitation, sensor module 120, sensor circuit 210, sensor module 330, and/or sensor module 420 such as disclosed at least with reference to FIGS. 1-4. The signal may include, for example at least one detection signal. The signal may, for example, include a raw detection signal. The signal may, for example, include a pre-conditioned detection signal. In various embodiments the method 600 may, by way of example and not limitation, be at least partially performed by a controller (e.g., control module 135 and/or control circuit 205 as disclosed at least with reference to FIGS. 1-2).

A detection profile is applied to the signal in a step 610 to generate a conditioned detection signal as a function of the detection profile. In some embodiments the detection profile may, for example, be at least part of an IRP. The detection profile may include, by way of example and not limitation, sensitivity parameters, time-averaging parameters, filter parameters (e.g., band-pass, notch, low-pass, high-pass, windowing), or some combination thereof.

An indication profile is applied in a step 615 to the conditioned detection signal generated in the step 610. The indication profile may, for example, be applied in a step 615. The indication profile may, for example, be retrieved from a datastore such as is disclosed with reference to the step 610.

If it is determined in a decision point 620, in response to the indication profile (e.g., IRP) applied in the step 615, to change a spatial distribution (e.g., number and/or position of emitters activated in one or more indicator arrays) relative to at least one current visual indication, then one or more control signals are generated in a step 625. The control signals may be generated according to the new spatial distribution. The new spatial distribution may be determined as a function of the indication profile applied to the detection signal. If it is determined not to change the spatial distribution in the decision point 620, then the method 600 proceeds directly to a decision point 630.

If it is determined in the decision point 630, in response to the indication profile applied in the step 615, to change a spectral distribution (e.g., color(s) emitted by one or more indicator arrays) relative to at least one current visual indicium, then one or more control signals are generated in a step 635. The control signals may be generated according to the new spectral distribution. The new spectral distribution may be determined as a function of the indication profile applied to the detection signal. If it is determined not to change the spectral distribution in the decision point 630, then the method 600 proceeds directly to a decision point 640.

If it is determined in the decision point 640, in response to the indication profile applied in the step 615, to change a time distribution (e.g., activation sequence of one or more emitter elements of one or more indicator arrays) relative to at least one current visual indicium, then one or more control signals are generated in a step 645. The control signals may be generated according to the new time distribution. The new time distribution may be determined as a function of the indication profile applied to the detection signal. If it is determined not to change the time distribution in the decision point 640, then the method 600 ends.

The control signal(s) generated (e.g., based on spatial, spectral, and/or time distribution) are transmitted to an indicator array in a step 650. The control signal(s) may, for example, be a single control signal. The control signal may, for example, be a composite (e.g., digital and/or analog) control signal. Accordingly, an indicator array (e.g., spatially distributed indicator array 130, indication array 215, indicator array 325, and/or indicator array 430 such as disclosed at least with reference to FIGS. 1-4) may be operated according to a detected signal as a function of one or more detection profiles and/or indication profiles. The exemplary method 600 ends.

Figure 7:
FIG. 7 depicts a flowchart of an exemplary method for generating a chatter mitigated output.
Figure 7:
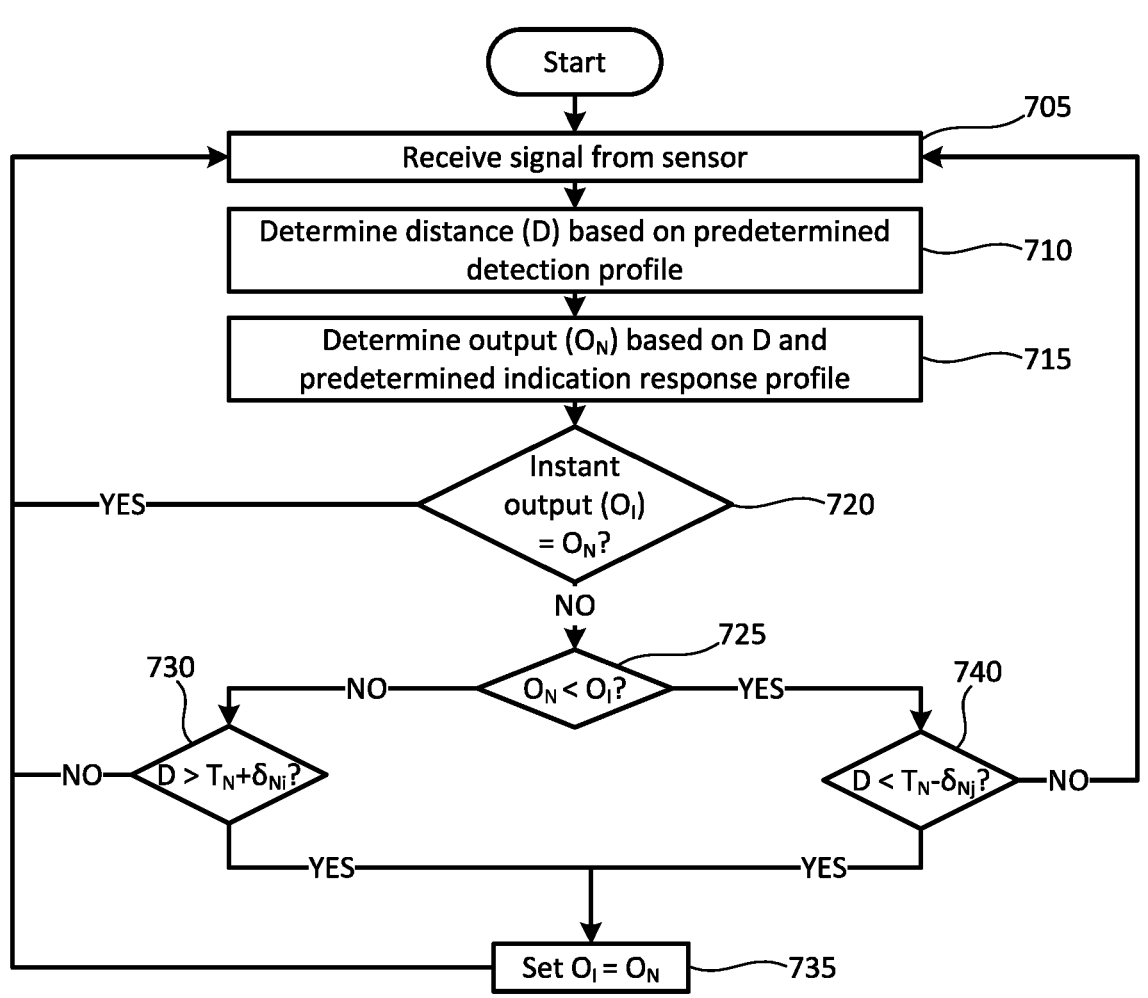

FIG. 7 depicts a flowchart of an exemplary method for generating a chatter mitigated output. In a method 700, a signal is received from a sensor (e.g., at least one sensor) in a step 705. The sensor may, for example, be part of a CMDS. The sensor may include at least some portion of a sensor module such as, by way of example and not limitation, sensor module 120, sensor circuit 210, sensor module 330, and/or sensor module 420 such as disclosed at least with reference to FIGS. 1-4. The signal may include, for example at least one detection signal. The signal may, for example, include a raw detection signal. The signal may, for example, include a pre-conditioned detection signal. In various embodiments the method 700 may, by way of example and not limitation, be at least partially performed by a controller (e.g., control module 135 and/or control circuit 205 as disclosed at least with reference to FIGS. 1-2). The sensor may, for example, be configured to generate the signal(s) as a function of distance to a target.

A distance (D) is determined in a step 710. The distance D is determined based on a predetermined detection profile. For example, the detection profile may include a transfer function sufficient to map a range of signals received from the sensor to a corresponding range of distances associated with the signals. In some embodiments the transfer function may, for example, be at least partially stored as a function and/or sequence of operations (e.g., by execution by a processor). In some embodiments the transfer function may, for example, be at least partially stored as a lookup table (LUT).

An output ($O_N$) is determined in a step 715 based on (1) D and (2) a predetermined indication response profile (IRP). The IRP may, for example, correlate one or more distances to one or more (visual) indication. The IRP may, for example, include parameter(s) identifying one or more ranges of distances to at least one visual indication. The IRP may, for example, include parameter(s) defining a first distance and a first visual indication. The IRP may, for example, include parameter(s) defining a second distance and a second visual indication. A controller may, for example, interpolate between the first distance and the second distance to generate, for example, a corresponding gradient and/or steps (e.g., defined by a step parameter in the IRP) between the first visual indication and the second visual indication. The $O_N$ may, for example, correspond to a predetermined transition point and/or transition range between two (predetermined) visual indication. The transition may, for example, be defined by one or more thresholds in the IRP.

A current output may, for example, currently be generated. This instant output ($O_I$) may, for example, be output as a control signal(s) to an indicator array. If the instant output $O_I$ is determined to be the same as $O_N$ in a decision point 720, then the method 700 returns to the step 705 (e.g., no change need be made to the current indication). If $O_N$ does not equal $O_I$ in the decision point 720, then the method 700 proceeds to a decision point 725.

$O_N$ may, for example, correspond to a graduated output (e.g., higher signal corresponding to activation of more emitter elements in an indicator array). $O_N$ may, for example, be determined based on at least one transition point (e.g., "$T_N$"). The transition point may, for example, be a point at which an indication is changed based on the signal received in the step 705. The transition point $T_N$ may, for example, include a threshold. In some embodiments a decision point (not shown) may determine, by way of example and not limitation, if the $O_N$ corresponds to a predetermined criterion (e.g., image metric, spectral range).

The IRP may, for example, define $T_N$ as a function of D. The IRP may, for example, define a transition range relative to $T_N$. For example, the IRP may define a lower transition threshold $\delta_{Ni}$. The IRP may, for example, define an upper transition threshold $\delta_{Nj}$. In some embodiments, for example, $\delta_{Ni} = \delta_{Nj}$. In some embodiments, for example, $\delta_{Ni} \neq \delta_{Nj}$. In some embodiments, for example, a value may be set which is applied to multiple $\delta_N$. In some embodiments, for example, an equation(s) may be defined by which $\delta_N$ may be (dynamically) determined.

If $O_N$ is determined, in a decision point 725, to be not less than $O_I$, then the method 700 proceeds to a decision point 730. If $O_N$ is determined, in the decision point 725, to be less than $O_I$, then the method 700 proceeds to a decision point 740. The decision point 730 may, for example, correspond to a situation in which a detection output is increasing (e.g., a vehicle is moving closer in the scenarios depicted in FIGS. 1 and 3, a level of contents is rising in the scenario depicted in FIG. 4). The decision point 740 may, for example, correspond to a situation in which the detection output is decreasing (e.g., a vehicle is moving away in the scenarios depicted in FIGS. 1 and 3, a level of contents is decreasing in the scenario depicted in FIG. 4).

If D is determined to not be greater than $O_N + \delta_{Ni}$ in the decision point 730, then the method 700 returns to the step 705 (e.g., waits to receive another signal from the sensor). Such a situation may, for example, correspond to a change in the detection signal which has crossed a nominal transition point, but has not exceeded an upper transition range. The upper transition range may, for example, suppress 'chatter' of a visual indication. For example, a transitory perturbation may have disturbed the detection signal. The upper transition range may, by way of example and not limitation, advantageously prevent an undesired 'blinking' of the indicator array from generating a current visual indication defined by $O_I$ (e.g., $O_{N-1}$) to a second visual indication $O_N$.

If D is determined to be greater than $T_N + \delta_{Ni}$ in the decision point 730, then the $O_I$ is set to $O_N$ (e.g., from $O_{N-1}$) in a step 735. For example, a vehicle may have approached close enough that the upper transition range has been exceeded. Accordingly, a user may, for example, advantageously have confidence in the visual indication generated corresponding to $O_N$ as being an accurate indication and not simply a transitory 'chatter' of the signal due to perturbations in the detection signal(s).

If D is determined to not be less than $T_N - \delta_{Nj}$ in the decision point 740, then the method 700 returns to the step 705. Such a situation may, for example, correspond to a change in the detection signal which has crossed below a nominal transition point (e.g., $T_N$), but has not dropped below the nominal transition point by a corresponding lower transition range. The lower transition range may, for example, suppress 'chatter' of the visual indication. For example, a transitory perturbation may have d disturbed the detection signal. The lower transition range may, by way of example and not limitation, advantageously prevent an undesired 'blinking' of the indicator array from generating a current visual indication defined by $O_I$ (e.g., $O_{N+1}$) to a second visual indication $O_N$.

If D is determined to be less than $T_N - \delta_{Nj}$ in the decision point 740, then the $O_I$ is set to $O_N$ (e.g., from $O_N + 1$) in the step 735. For example, a vehicle may have backed far enough away that the (detection) signal has dropped below the lower transition range. Accordingly, a user may, for example, advantageously have confidence in the visual indication generated corresponding to $O_N$ as being an accurate indication and not simply a transitory 'chatter' of the signal due to perturbations in the detection signal(s).

After the step 735, the method returns to the step 705 to receive the next signal. In some embodiments the method 700 may, for example, be interrupted by a termination command, power switch, or some combination thereof.

Figure 8:
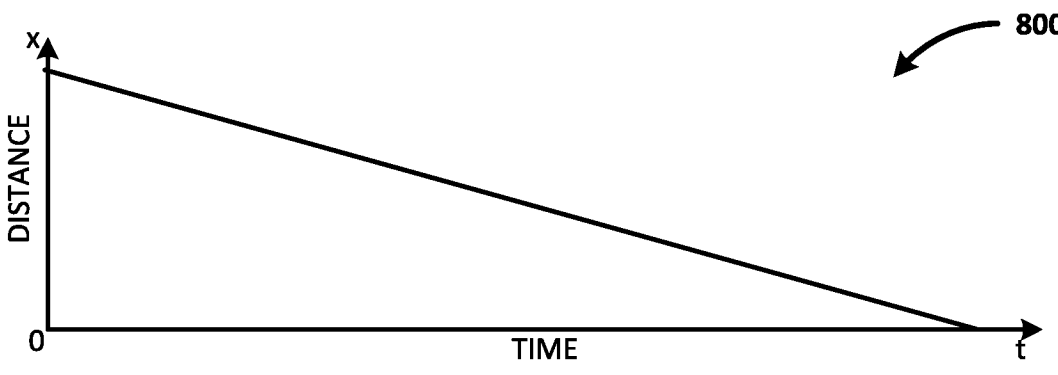
FIG. 8 depicts illustrative charts correlating motion of an exemplary ranged target, a corresponding detection signal, a corresponding conditioned signal, and a corresponding indicator control signal.
Figure 8:
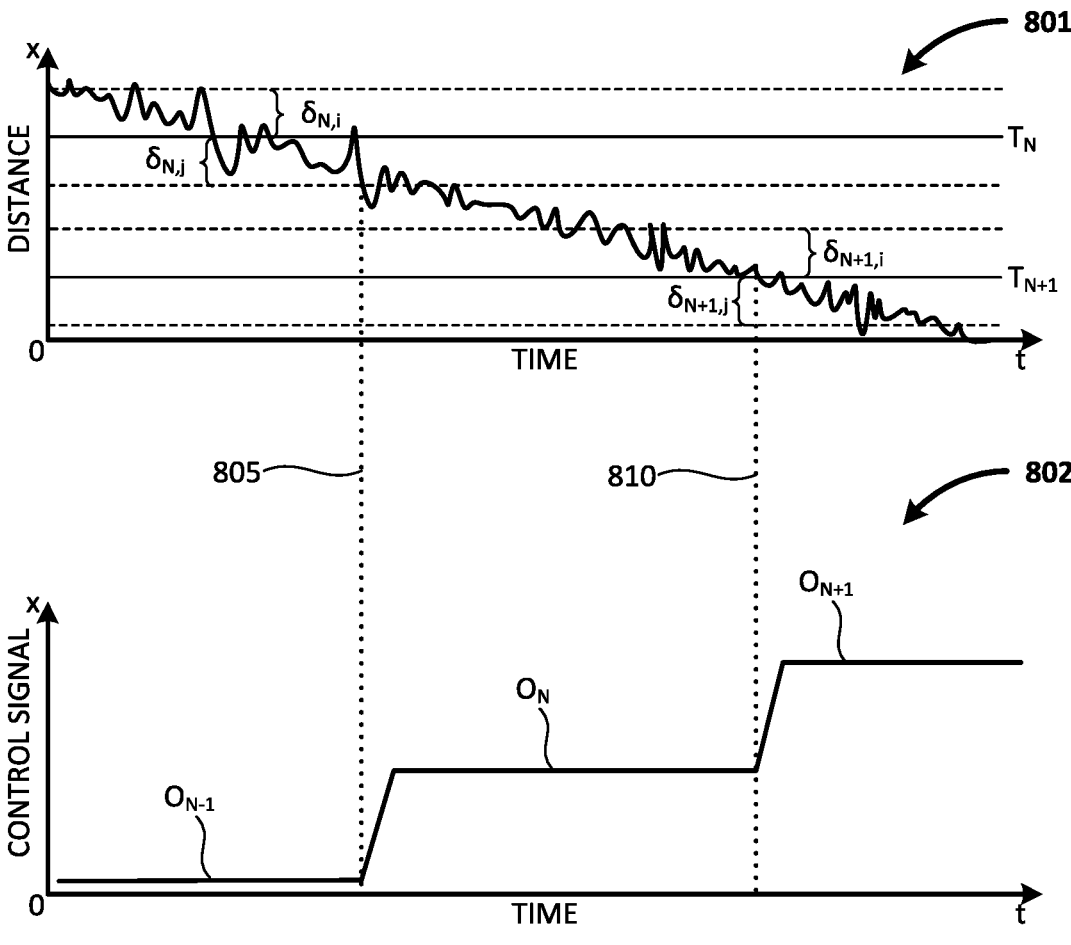

FIG. 8 depicts illustrative charts correlating motion of an exemplary ranged target, a corresponding detection signal, a corresponding conditioned signal, and a corresponding indicator control signal. A plot 800 depicts a distance of an exemplary ranged target with respect to time. The ranged target may, by way of example and not limitation, be an approaching object (e.g., a vehicle such as disclosed at least with reference to FIGS. 1 and 3). The ranged target may, for example, be level of contents in a container (e.g., such as disclosed at least with reference to FIG. 4). The ranged target may, for example, be a human approaching a safeguarded (hazardous) work area. The ranged target may, for example, be an item being positioned (e.g., by a machine, by a worker), such as in a manufacturing facility (e.g., stock material on a machine such as a plasma cutter, electronic component positioning on a circuit board, component positioning in a facility). The distance may, by way of example and not limitation, be a calculated distance (e.g., meters, microns, inches, feet). The distance may, for example, be a signal proportional to distance. The distance may, for example, be a distance between the ranged target and a sensor(s) of a CMDS.

In the plot 800, the distance is decreasing monotonically (linearly, as depicted) with time. For example, a vehicle may be steadily approaching. A plot 801 depicts a signal generated corresponding to the distance depicted in the plot 800. The plot 801 may, for example, depict a detection signal (e.g., raw, pre-conditioned) of the sensor(s). As depicted, the detection signal of the plot 801 generally trends downward with time, following the general trend of the plot 800. However, the detection signal of the plot 801 includes local perturbations which disturb the general trend.

An IRP may, for example, define multiple transition points for an output (e.g., $O_I$) of an indication array(s). In the depicted example, a first nominal transition point $T_N$ and a second nominal transition point $T_{N+1}$ are depicted on the plot 801. If the detection signal shown in the plot 801 was, for example, directly applied to determine the output (e.g., $O_I$) of the indicator array(s), significant chatter of the resulting visual indication may ensue as the perturbations cross and re-cross the nominal transition points.

The IRP may, for example, further define upper and/or lower transition ranges corresponding to the transition points. In the depicted example, each nominal transition point $T_N$ is provided with an associated upper transition range $\delta_{N,i}$ and an associated lower transition range $\delta_{Nj}$. A controller may, for example, be configured (e.g., by applying a method such as disclosed at least with reference to FIG. 7) to only generate a control signal corresponding to the distance crossing the nominal transition point $T_N$ if the detection signal further crosses the corresponding transition range $\delta_N$.

In the depicted example, the detection signal shown in the plot 801 crosses and recrosses the first nominal transition point $T_N$ several times before falling below the corresponding $\delta_{Nj}$. A corresponding control signal generated in response to the detection signal as a function of the IRP is depicted in a plot 802. As depicted, the $O_I$ is first a previous control signal $O_{N-1}$ (e.g., corresponding to a visual indication associated with a range of distance between the $T_N$ and a previous nominal threshold $T_{N-1}$). Once the detection signal crosses the $T_N - \delta_{Nj}$ boundary, as depicted by a line 805, the control signal is updated to a second output $O_N$ (e.g., corresponding to a second visual indication associated with the distance range between $T_N$ and $T_{N+1}$).

Again, the detection signal continues to trend downward, but crosses and recrosses a second nominal transition point $T_{N+1}$. The control signal is not updated from the second output $O_N$ to a third output $O_{N+1}$ (e.g., corresponding to a third visual indication associated with a distance range above $T_{N+1}$) in response until the detection signal crosses the $T_{N+1}-\delta_{N+1j}$ boundary, as depicted by a line 810.

Moreover, as depicted, the control signal is not changed from $O_N$, for example, back to $O_{N-1}$ in response to the detection signal rising above $T_N$ because the detection signal does not cross the upper transition range defined by $T_N+\delta_{N,i}$. Accordingly, the output signal $O_I$ may, for example, be advantageously smoothly incremented with eliminated or reduced chatter induced by local perturbations.

Figure 9:
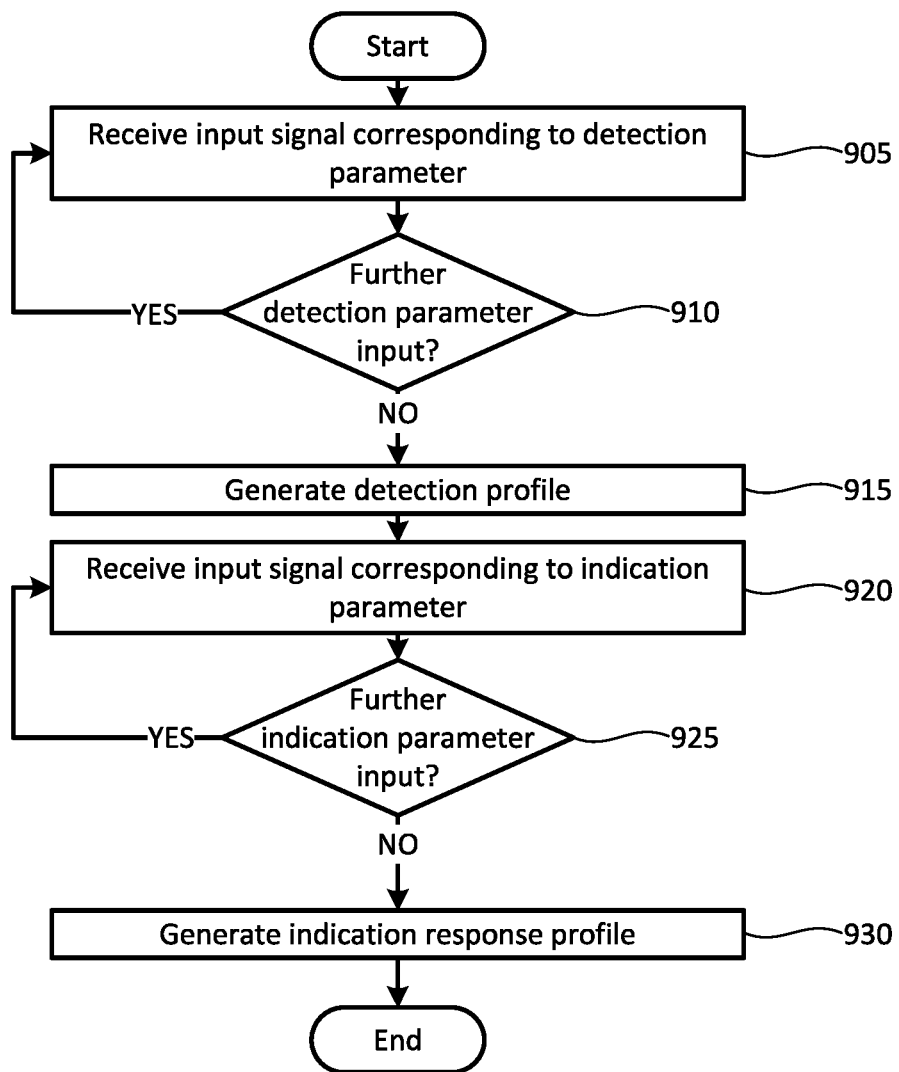
FIG. 9 depicts a flowchart of an exemplary method for generating an exemplary detection profile and an exemplary indication response profile.

FIG. 9 depicts a flowchart of an exemplary method for generating an exemplary detection profile and an exemplary indication response profile. In a method 900, an input signal is received in a step 905. The input signal corresponds to a detection parameter. The input signal may, for example, be received by a controller (e.g., control module 135, control circuit 205, and/or processor 225, such as disclosed at least with reference to FIGS. 1-2). The input signal may, for example, be generated in response to input from a user via an HMI (e.g., through the communication module 255 disclosed at least with reference to FIG. 2). The detection parameter may, for example, correspond to a conditioning parameter (e.g., filtering, averaging). The detection parameter may, for example, be received from a human. The detection parameter may, for example, be automatically generated (e.g., in response to a predetermined algorithm). The predetermined algorithm may, by way of example and not limitation, determine the detection parameter as a function of previous detection signals, as a function of other parameters, as a function of previous output signals, or some combination thereof.

If further input corresponding to a detection parameter is received in a decision point 910, then the method 900 returns to the step 905. If further input corresponding to a detection parameter is not received (e.g., a detection profile input is complete, a signal is received indicating input of detection parameters is terminated) then a detection profile is generated in a step 915.

An input signal is received in a step 920. The input signal corresponds to an indication parameter. The input signal may, for example, be received via an HMI. The input signal may, for example, be received from a network. The input signal may, for example, be generated in response to manual input. The input signal may, for example, be automatically generated.

The indication parameter may, for example, correspond to a nominal threshold point (e.g., $T_N$). The indication parameter may, for example, correspond to a transition range (e.g., $\delta_N$). The indication parameter may, for example, correspond to a spatial distribution of a visual indication. The indication parameter may, for example, correspond to a spectral distribution of a visual indication. The indication parameter may, for example, correspond to a time distribution of a visual indication.

If further input corresponding to an indication parameter is received in a decision point 925, then the method 900 returns to the step 920. If further input corresponding to an indication parameter is not received (e.g., an indication profile input is complete, a signal is received indicating input of indication parameters is terminated) then a detection profile is generated in a step 930 and the method 900 ends.

Accordingly, a detection and/or indication profile may be advantageously generated. The method 900 may, for example, correspond to input prompts and/or interfaces provided to a user to configure a detection and/or indication profile for a CMDS. In some embodiments the detection profile may, for example, be configured to correspond to a sensor module(s) of a CMDS. In some embodiments the indication profile (e.g., IRP) may, for example, be configured to correspond to an indication array(s) of a CMDS. In some embodiments a single processor module may, for example, apply both the detection unit and the IRP. Accordingly, various embodiments may advantageously achieve cost savings by reducing a number of processors. Some embodiments may, for example, achieve performance improvements by reducing data transfer. Some embodiments may, for example, advantageously reduce installation and/or configuration time and/or difficulty by providing a single configuration interface and/or process.

Figure 10:
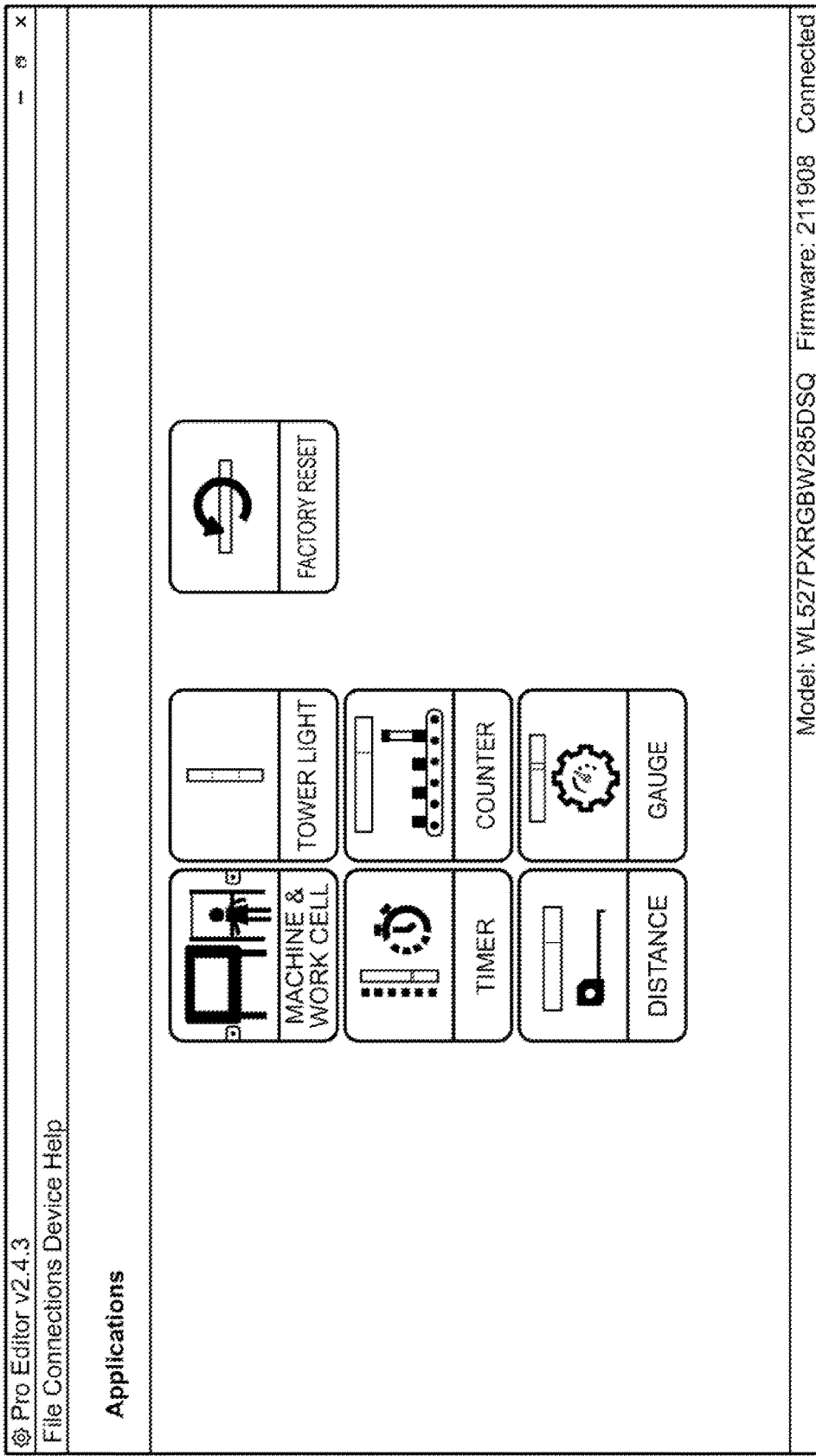
FIG. 10 depicts an exemplary CMDS configuration interface.

FIG. 10 depicts an exemplary CMDS configuration interface. An exemplary interface 1000 is depicted. The exemplary interface 1000 may, for example, be provided on a display device (e.g., a computer screen, smartphone display). The exemplary interface 1000, as depicted, provides multiple predetermined options for configuration of a CMDS. The predetermined options may, for example, generate, retrieve, and/or apply a predetermined detection profile and/or IRP for a specific use (e.g., the scenarios depicted including tower light, timer, counter). Further screens may, for example, prompt a user for input to further configure and/or customize the detection profile(s) and/or IRP(s). The exemplary interface 1000 further includes a factory reset (e.g., to restore factory default parameters).

Figure 11:
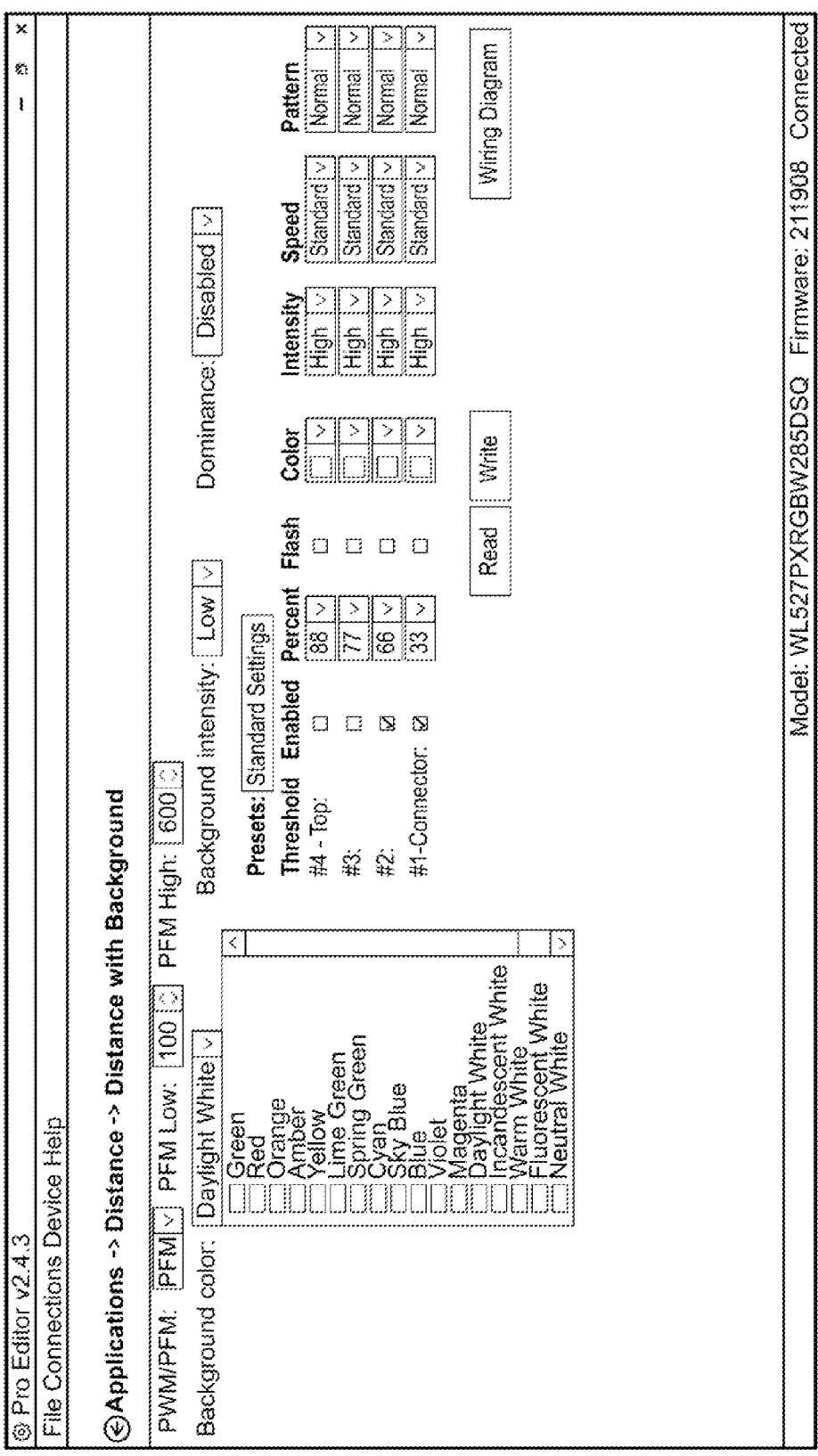
FIG. 11 depicts an exemplary IRP and/or detection profile generation interface.

FIG. 11 depicts an exemplary IRP and/or detection profile generation interface. An exemplary interface 1100 is depicted. The exemplary interface 1100 includes (nominal) threshold points, spectral distribution(s) (e.g., color, pattern, intensity), time distribution (e.g., speed, pattern), spatial distribution (e.g., emitter element(s) enabled/disabled). The interface further allows the parameter(s) to be written (e.g., saved to generate a new or updated IRP) and/or retrieved (e.g., from an existing IRP). The interface further allows a wiring diagram to be generated. In some implementations, an IRP may, for example, be configured based on velocity metrics. In some implementations, for example, an IRP may be configured based on acceleration metrics (e.g., criterion). An IRP may, for example, be configured using jerk metrics.

The exemplary interface 1100 further prompts for input for parameter(s) which may be implemented in the IRP and/or in a detection profile(s). The depicted parameters include PWM vs PFM (Pulse Width Modulation vs. Pulse Frequency Modulation), and PFM range parameters.

Figure 12:
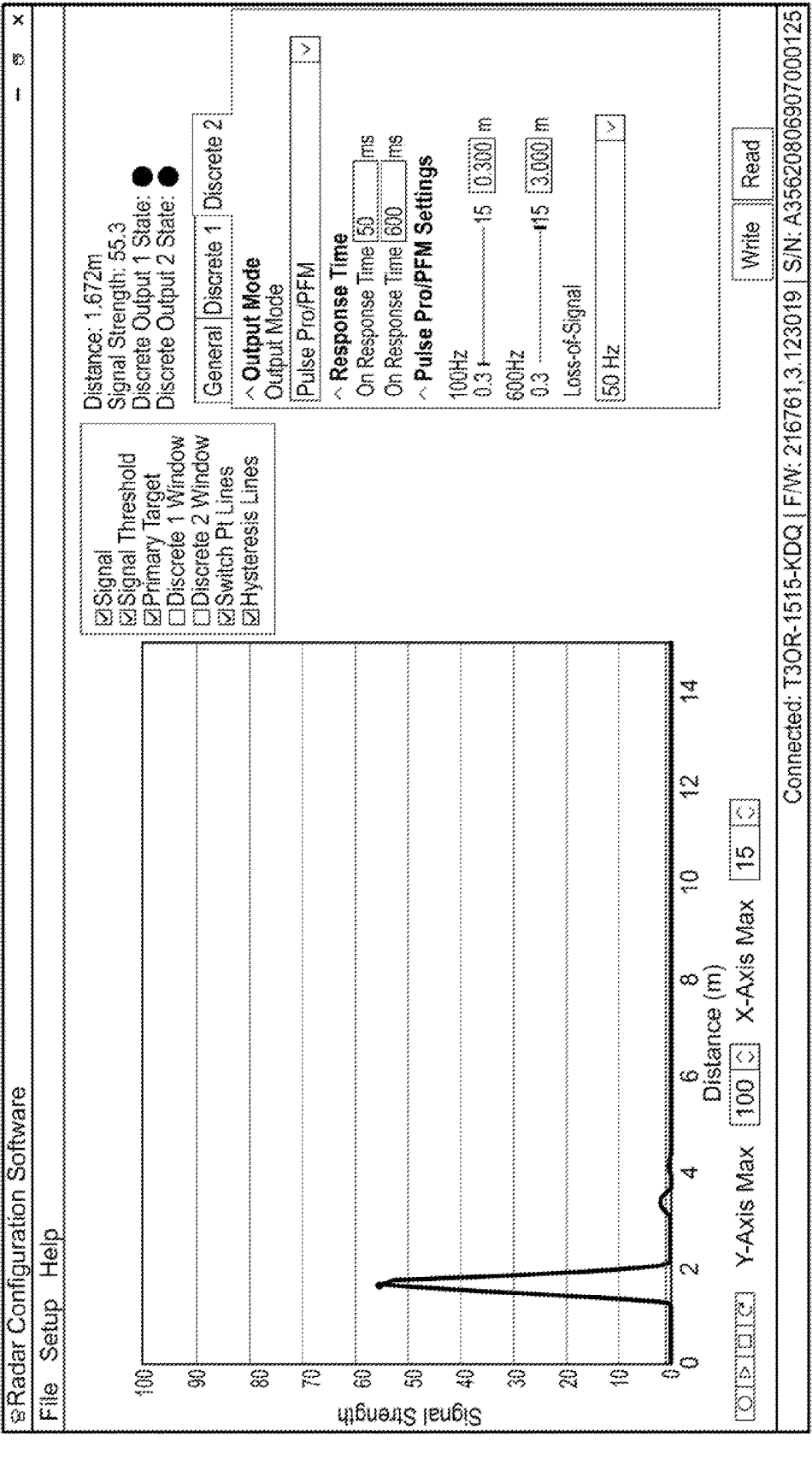
FIG. 12 depicts an exemplary IRP and/or detection profile generation interface.

FIG. 12 depicts an exemplary IRP and/or detection profile generation interface. An exemplary interface 1200 is depicted. The exemplary interface 1200 includes an interactive display for setting a target(s). The exemplary interface 1200 further includes input for setting signal threshold(s) (e.g., $T_N$). The exemplary interface 1200 includes input for setting hysteresis lines (e.g., as an exemplary implementation of $\delta_N$). Additional sensor module settings are provided, as depicted. In various embodiments, user input may be used to generate one or more detection profile and/or IRP.

Figure 13:
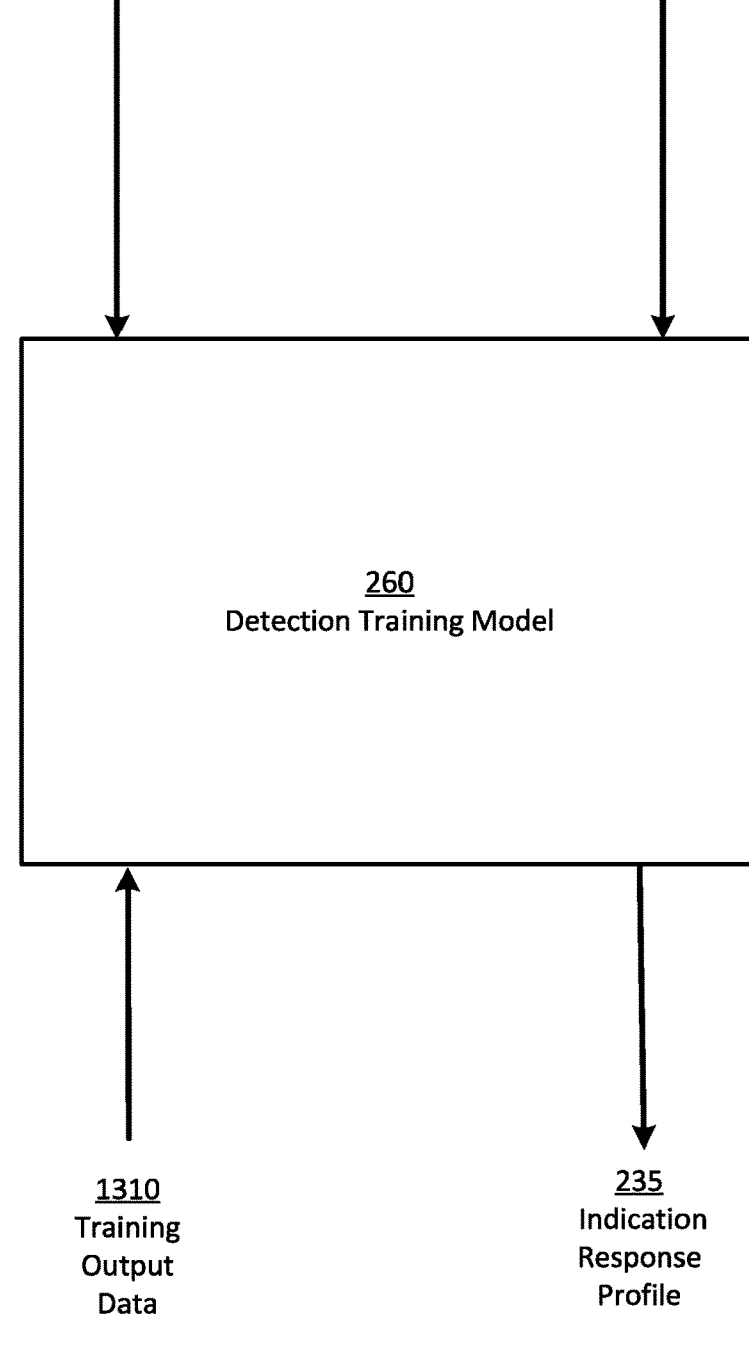
FIG. 13 depicts an exemplary machine learning engine for an indicator response profile.

FIG. 13 depicts an exemplary machine learning engine for an indicator response profile. In an exemplary scenario 1300, the detection training module (DTM 260) includes a machine learning model. The machine learning model may, by way of example and not limitation, include a neural network model. The neural network model may include, for example, recurrent neural network (RNN) and/or deep neural network (DNN). The machine learning model may, for example, include an ensemble model. Different neural network models may be selected. The number of the model layers (e.g., the hidden neurons) may also be determined based on, for example, the complexity of the IRPs and the chatters and perturbations received in the scenario 1300.

In some implementations, the machine learning model may include a classification model. For example, the machine learning model may include a statistical classifier (e.g., a Bayesian classifier). In some examples, the machine learning model may include a random forest decision tree. In some implementations, the machine learning model may include a k-nearest neighbor algorithm for training the IRPs.

A set of training data is applied to the DTM 260 to train the machine learning model. The training data includes a set of training input data 1305 and a set of training output data 1310. The set of training input data 1305 may include historical detection signals. The training input data 1305 may include, for example, user inputs corresponding to the historical detection signal. For example, the user input may be received from the interface 1200. The training input data 1305 may include, for example, current and/or historical IRPs. The training input data 1305 may include, for example, current and/or historical detection profiles.

The set of training output data 1310 may include historical control signals. The training output data 1310 may, for example, be selected to correspond to the training input data 1305. In some embodiments, before training, a set of testing data (including testing input data and testing output data) may be divided from the training data. After the DTM 260 is trained, the testing data may be applied to the trained model to test the training accuracy of the model. For example, the trained model may receive the testing input data and generate an output data in response to the testing input data. The generated output data may be compared with the testing output data to determine the prediction accuracy (e.g., based on a predetermined criterion(s) such as a maximum error threshold). In some embodiments, one or more models (e.g., neural network models) may be cascaded together. The cascaded model may be trained and tested.

During operation, a detection signal 1315 may be provided as inputs to the (trained) DTM 260. The DTM 260 may generate, in response, corresponding IRPs 235.

FIG. 14 depicts an exemplary method of training a detection training model. A method 1400 may, for example, be performed by a processor(s) (e.g., the processor 225) executing a program(s) of instructions retrieved from a data store(s) (e.g., the memory module 230). The method 1400 includes, at a step 1405, receiving the historical detection signals. At a step 1410, corresponding control signals based on current detection profiles (e.g., the detection profile 240) and indication response profiles (e.g., the IRP 235) are determined and retrieved.

At a step 1415, the retrieved data is divided into a first set of data used for training and a second set of data used for testing. At a step 1420, a model (e.g., the DTM 260) is applied to the training data to generate a trained model (e.g., a classification model). The trained model is applied to the testing data, in a step 1425, to generate test output(s) (e.g., content attribute profile(s)). The output is evaluated, in a decision point 1430, to determine whether the model is successfully trained (e.g., by comparison to a predetermined training criterion(s)). The predetermined training criterion(s) may, for example, be a maximum error threshold. For example, if a difference between the actual output (the test data) and the predicted output (the test output) is within a predetermined range, then the model may be regarded as successfully trained. If the difference is not within the predetermined range, then the model may be regarded as not successfully trained. At a step 1435, the processor may generate a signal(s) requesting additional training data, and the method 1400 loops back to step 1425. If the model is determined, at the decision point 1430, to be successfully trained, then the trained model may be stored (e.g., in the memory module 230), in a step 1440, and the method 1400 ends.

In various embodiments an indicator array may extend spatially in one or more dimensions. For example, an indicator array may extend substantially in one direction (e.g., linearly). An indicator array may, for example, extend substantially in two directions (e.g., planar, curvilinear). An indicator array may, for example, extend in three dimensions (e.g., a 3D surface). In some embodiments an indicator array may, by way of example and not limitation be configured as a strip light. An indicator array may, for example, be configured as a dome. An indicator array may, for example, be configured as an area light.

In various embodiments a sensor may be configured to transduce one or more physical phenomena. For example, in some embodiments a sensor may be configured to detect temperature. A sensor may, for example, be configured to detect pressure. A sensor may, for example, be configured to detect vibration. In some embodiments a sensor may, by way of example and not limitation, be configured to detect humidity. A sensor may, for example, be configured to detect at least one analyte. An analyte may include, by way of example and not limitation, oxygen, carbon dioxide, hydrogen, sulfur, nitrogen, water vapor, or some combination thereof. In some embodiments a sensor may, for example, include an optical sensor. The optical sensor may, for example, include an imaging array (e.g., a CMOS sensor). A controller may, for example, be configured to process the images (e.g., machine vision). In some embodiments a sensor may, for example, be configured to detect distance. The distance sensor may, by way of example and not limitation, be configured as a three-dimensional time of flight sensor.

In some embodiments an indicator may, for example, provide a spatially, spectrally (e.g., frequency), and/or time-distributed audio indication. The audio indication may, for example, be configured to vary in intensity as a function of a sensor input (e.g., distance). The audio indication may, for example, be configured to vary in frequency as a function of a sensor input. The audio indication may, for example, be configured to vary in position (e.g., activation of spatially distributed audio emitting elements) as a function of a sensor input.

In various embodiments a controller output may, for example, include a pulse-width modulated (PWM) signal. The PWM signal may, for example, be provided to an indicator module having at least one RGB LED. The indicator module may include an array of RGB LED elements. The PWM signal may, for example, include multiple PWM signals (e.g., red, green, and/or blue control signals). The duty cycle of one or more of the PWM signals may, for example, be varied to control a resulting intensity of emission of one or more of the RGB LED elements. Multiple RGB LED elements may, for example, be simultaneously controlled to generate a smooth, gradual gradient (e.g., decrease, increase) in signal. The gradient may, for example, be generated as a function of one or more sensor inputs.

In various embodiments an IRP and/or detection profile may, by way of example and not limitation, define multiple thresholds. In an exemplary illustration, an IRP may define two different thresholds. An IRP may, for example, define three thresholds. An IRP may, for example, define four thresholds. An IRP may, for example, define five thresholds. An IRP may, for example, define more than five thresholds.

In some embodiments an IRP and/or detection profile may, for example, define a nominal range. The profile may further define a 'too high' threshold (e.g., an upper threshold). The profile may define a 'too low' threshold (e.g., a lower threshold). A controller may, for example, apply the nominal range and/or thresholds to effect one or more different animations in response to changes in a detection signal.

In some embodiments ranges defined by an IRP and/or detection profile may, for example, overlap. A profile may, for example, define at least one order of priority. The order of priority may, for example, be time based. In an exemplary "non-dominant" embodiment, an input signal entering a predetermined range may cause an additional indication to be displayed (e.g., in space, time, and/or spectrum). For example, another color may be added at another spatial location than previously generated but still active indication. In an exemplary "dominant" embodiment, an input signal entering a predetermined range may cause a new indication to replace previous indications (e.g., a complete change in color, time pattern, and/or spatial distribution).

In some embodiments an IRP and/or detection profile may, for example, include at least one criterion related to signal strength. In various embodiments, for example, an IRP may define at least one window of a (substantially) continuously variable signal. As an illustrative example, an IRP may define an intensity criterion. The intensity criterion may, for example, correspond to an intensity of light on a surface of an imaging array. For example, the intensity of light may be defined relative to alignment of detected light by the imaging array with a peak transmitted light from an emitter. The IRP may, for example, define one or more criteria relating to signal power, saturation, or some combination thereof. For example, an IRP may define one or more criteria relating to an attribute(s) of a sensor. An IRP may, for example, define saturation threshold(s) of an optical sensor. An IRP may, for example, define decibel threshold(s) of an acoustic sensor.

Various embodiments may, for example, provide a single device combining sensing and indication functions. The single device may, for example, be (user) configurable. A user may, for example, quickly and/or easily customize the indication and/or sensing functions. For example, the user(s) may generate at least one IRP and/or detection profile such that a desired indication(s) is generated in response to a detection signal(s) matching one or more predetermined criteria. Various embodiments may provide, for example, advantageously processing of the detection signal(s) such that chatter is suppressed in the resulting indication(s). Various embodiments may advantageously supply an unmet need of combined indication and detection (e.g., in a single housing) with chatter-mitigated indication.

Although an exemplary controller is shown with respect to the figures, other filter and/or logic modules may be employed. For example, filtration and/or logic may be applied internally (e.g., in another component). Filtration and/or logic may, for example, be implemented externally (e.g., as an input, to an output).

In some implementations, by way of example and not limitation, chatter mitigation processing may be applied to an output of sensor. In some implementations, by way of example and not limitation, chatter mitigation processing may be applied to an input of an indicator. In some examples, chatter mitigation processing may be applied in between an output of a sensor and an input of an indicator (e.g., as a standalone entity in the same housing as the indicator and/or sensor, as a standalone entity outside of the housing). For example, in some implementations, sensor output(s) and indicator input(s) may be filtered and/or control logic applied independently.

In some embodiments, components may, for example, be separated. For example, a CMDS may include a first housing, a second housing, and/or a third housing. The first housing may, for example, include a sensor. The second housing may, for example, include a controller. The third housing may, for example, include an indicator. In some implementations, the controller may be in the first housing. In some implementations, the controller may be in the third housing.

As depicted in the figures, some implementations may, for example, have a single housing including a sensor(s), a controller(s), and/or an indicator(s). In some implementations, for example, a housing may include sub-housings (e.g., the first housing, the second housing, the third housing).

In some embodiments, a housing may, for example, be enclosed. A housing may, for example, be open (e.g., a unitary platform). In some implementations, a housing may, for example, be a unitary structure (e.g., continuous material). In some implementations, for example, a housing may be multi-component (e.g., multi-piece shell).

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a detection system with chatter-mitigated output indication may include a housing (e.g., 265). The detection system may include a sensor (e.g., 210) coupled to the housing. The sensor may be configured to be affixed to a stationary object and to generate a detection signal, in response to detection of at least one target in a detection field, as a function of a spatial relationship of the at least one target to the sensor. The detection system may include a control circuit (e.g., 205) coupled to the housing. The control circuit may be configured to generate a control signal, in response to the detection signal, as a function of a predetermined indication response profile defining a transition threshold ($\delta Ni$) for each of multiple nominal transition points (TN). The detection system may include a light-emitting indicator array (e.g., 215) coupled to the housing. The light-emitting indicator array may be configured to generate spatially-distributed visual indication in response to the control signal. The visual indication generated may change from a first spatial distribution (S1) to a second spatial distribution (S2) in response to the detection signal crossing a first nominal transition point (T1) by at least a corresponding transition threshold ($\delta 1i$) such that spatial distribution of the visual indication does not respond to perturbations in the detection signal causing the detection signal to cross T1 by less than $\delta 1i$.

The transition threshold $\delta Ni$ for each corresponding TN may be an upper transition threshold. The control signal may be generated such that the visual indication changes from S1 to S2 in response to an increase in the detection signal from below T1 to above T1 only when the detection signal exceeds T1 by $\delta 1i$.

The predetermined indication response profile may further define a lower transition threshold ($\delta Nj$) for each corresponding TN. The control signal may be generated such that the visual indication changes from S1 to a third spatial distribution (S3) in response to a decrease in the detection signal from above T1 to below T1 only when the detection signal decreases below T1 by a corresponding lower transition threshold ($\delta 1j$).

The sensor may include an emitter configured to launch a first electromagnetic signal. The sensor may include a receiver configured to generate, in response to receiving a reflected electromagnetic signal from reflection of the first electromagnetic signal off the at least one target, the detection signal. The sensor may include a distance sensor. The spatial relationship may include distance from the at least one target to the sensor.

The predetermined indication response profile may further define multiple predetermined spectral bands corresponding to at least one of the TN such that the control signal is generated as a function of at least one corresponding predetermined spectral band. The indicator array may be further configured to generate the visual indication in response to the control signal such that the visual indication is spectrally distributed. The generated visual indication may change from a first spectral distribution (C1) to a second spectral distribution (C2) in response to the detection signal crossing a second nominal transition point (T2) by a corresponding transition threshold ($\delta 2i$) such that spectral distribution of the visual indication does not respond to perturbations in the detection signal causing the detection signal to cross T2 by less than $\delta 2i$. In some examples, T2 may be T1. In some examples, $\delta 2i$ may be $\delta 1i$.

The control circuit may further include a training module configured to train the predetermined indication response profile as a function of user input and the detection signal.

In an illustrative aspect, a detection system with chatter-mitigated output indication may include a sensor (e.g., 210) configured to be affixed to an object and to generate a detection signal, in response to detection of at least one target in a detection field, as a function of a physical relationship of the at least one target to the sensor. The detection system may include a control circuit (e.g., 205) configured to generate a control signal, in response to the detection signal, as a function of a predetermined indication response profile defining a transition threshold ($\delta Ni$) for each of multiple nominal transition points (TN). The detection system may include an indicator array (e.g., 215) configured to generate spatially-distributed indication in response to the control signal. The indication generated may change from a first spatial distribution (S1) to a second spatial distribution (S2) in response to the detection signal crossing a first nominal transition point (T1) by at least a corresponding transition threshold ($\delta 1i$) such that spatial distribution of the indication does not respond to perturbations in the detection signal causing the detection signal to cross T1 by less than $\delta 1i$.

The transition threshold $\delta Ni$ for each corresponding TN may be an upper transition threshold. The control signal may be generated such that the indication changes from S1 to S2 in response to an increase in the detection signal from below T1 to above T1 only when the detection signal exceeds T1 by $\delta 1i$.

The predetermined indication response profile may further define a lower transition threshold ($\delta Nj$) for each corresponding TN. The control signal may be generated such that the indication changes from S1 to a third spatial distribution (S3) in response to a decrease in the detection signal from above T1 to below T1 only when the detection signal decreases below T1 by a corresponding lower transition threshold ($\delta 1j$).

The detection system may include a housing configured to mechanically couple the sensor, the controller, and the indicator array. The housing may, for example, be of a unitary construction.

The sensor may include an emitter configured to launch a first signal. The sensor may include a receiver configured to generate, in response to receiving a reflected signal from reflection of the first signal off the at least one target, the detection signal.

The sensor may include a distance sensor. The physical relationship may include distance from the at least one target to the sensor.

The predetermined indication response profile may further define multiple predetermined spectral bands corresponding to at least one of the TN such that the control signal is generated as a function of at least one corresponding predetermined spectral band. The indicator array may be further configured to generate the indication in response to the control signal such that the indication is spectrally distributed. The generated indication may change from a first spectral distribution (C1) to a second spectral distribution (C2) in response to the detection signal crossing a second nominal transition point (T2) by a corresponding transition threshold ($\delta 2i$) such that spectral distribution of the indication does not respond to perturbations in the detection signal causing the detection signal to cross T2 by less than $\delta 2i$. In an illustrative example, T2 may be T1. In an illustrative example, $\delta 2i$ may be $\delta 1i$.

The control circuit may include a training module configured to train the predetermined indication response profile as a function of user input and the detection signal.

The indicator array may be configured to emit the spatially-distributed indication such that the spatially-distributed indication is a visible indication visible from a field of view of at least 180°.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A detection system with chatter-mitigated output indication, the system comprising:

a housing;

a sensor coupled to the housing, configured to be affixed to a stationary object and to generate a detection signal, in response to detection of at least one target in a detection field, as a function of a spatial relationship of the at least one target to the sensor;

a control circuit coupled to the housing, configured to generate a control signal, in response to the detection signal, as a function of a predetermined indication response profile, wherein the predetermined indication response profile comprises:

a plurality of continuous but non-overlapping output ranges ($O_j$) corresponding to the detection signal, wherein each of the output ranges are separated by a plurality of nominal transition points ($T_N$) corresponding to distance thresholds for the detection signal, and a transition threshold ($\delta_{Ni}$) for each of the nominal transition points, the transition thresholds implemented as hysteresis lines; and, a light-emitting indicator array comprising a plurality of spatially-distributed visual indications, each corresponding to one of the plurality of output ranges, and wherein, in response to the control signal, the light-emitting indicator array is configured to generate one of the spatially-distributed visual indications corresponds to the spatial relationship between the at least one target and the sensor, wherein:

when the spatially-distributed visual indication generated by the light-emitting indicator array changes from a first spatial distribution ($S_1$) to a second spatial distribution ($S_2$) in response to the control signal as a function of a change in the spatial relationship represented by the detection signal crossing a first nominal transition point ($T_1$) by at least a corresponding transition threshold ($\delta_{1i}$), the spatially-distributed visual indication does not respond to perturbations in the detection signal causing the detection signal to cross the nominal transition point $T_1$ by less than the corresponding transition threshold $\delta_{1i}$, and, the light-emitting indicator array is coupled to the housing, such that the sensor, the control circuit, and the light-emitting indicator array are unitary and configured as a single unit for functional and physical manipulation;

wherein the control circuit applies a smoothing function to the detection signal to generate a conditioned signal, the smoothing function being configured to attenuate perturbations and transient fluctuations in the detection signal.

2. The detection system of claim 1, wherein:

the transition threshold $\delta_{Ni}$ for each corresponding $T_N$ is an upper transition threshold, and, the control signal is generated such that the visual indication changes from $S_1$ to $S_2$ in response to an increase in the detection signal from below $T_1$ to above $T_1$ only when the detection signal exceeds T1 by $\delta_{1i}$.

3. The detection system of claim 1, wherein:

the predetermined indication response profile further defines a lower transition threshold ($\delta_{Nj}$) for each corresponding $T_N$, and, the control signal is generated such that the visual indication changes from $S_1$ to a third spatial distribution ($S_3$) in response to a decrease in the detection signal from above $T_1$ to below $T_1$ only when the detection signal decreases below $T_1$ by a corresponding lower transition threshold ($\delta_{1j}$).

4. The detection system of claim 1, wherein the sensor comprises:

an emitter configured to launch a first electromagnetic signal; and, a receiver configured to generate, in response to receiving a reflected electromagnetic signal from reflection of the first electromagnetic signal off the at least one target, the detection signal.

5. The detection system of claim 1, wherein:

the sensor comprises a distance sensor, and, the spatial relationship comprises distance from the at least one target to the sensor.

6. The detection system of claim 1, wherein:

the predetermined indication response profile further defines a plurality of predetermined spectral bands corresponding to at least one of the $T_N$ such that the control signal is generated as a function of at least one corresponding predetermined spectral band, and, the indicator array is further configured to generate the visual indication in response to the control signal such that the visual indication is spectrally distributed, wherein the generated visual indication changes from a first spectral distribution ($C_1$) to a second spectral distribution ($C_2$) in response to the detection signal crossing a second nominal transition point ($T_2$) by a corresponding transition threshold ($\delta_{2i}$) such that spectral distribution of the visual indication does not respond to perturbations in the detection signal causing the detection signal to cross $T_2$ by less than $\delta_{2i}$.

7. The detection system of claim 6, wherein $T_2$ is $T_1$.

8. The detection system of claim 6, wherein $\delta_{2i}$ is $\delta_{1i}$.

9. The detection system of claim 1, wherein the control circuit further comprise a training module configured to train the predetermined indication response profile as a function of user input and the detection signal.

10. A detection system with chatter-mitigated output indication, the system comprising:

a sensor configured to be affixed to an object and to generate a detection signal, in response to detection of at least one target in a detection field, as a function of a physical relationship of the at least one target to the sensor;

a control circuit configured to generate a control signal, in response to the detection signal, as a function of a predetermined indication response profile, wherein the predetermined indication response profile comprises:

a plurality of nominal transition points ($T_N$) corresponding to distance thresholds for the detection signal, and a transition threshold ($\delta_{Ni}$) for each of the nominal transition points, the transition thresholds implemented as hysteresis lines, an indicator array comprising a plurality of spatially-distributed indications, wherein the indicator array is configured to generate one of the spatially-distributed indications in response to the control signal, such that the generated spatially-distributed indication corresponds to the physical relationship between the at least one target and the sensor; and, a unitary housing configured to mechanically couple the sensor, the controller, and the indicator array into a unitary unit, wherein:

when the spatially-distributed indication generated by the indicator array changes from a first spatial distribution $(S_1)$ to a second spatial distribution (Sa) in response to the control signal as a function of a change in the physical relationship represented by the detection signal crossing a first nominal transition point $(T_1)$ by at least a corresponding transition threshold $(\delta_{1i})$, the spatial distribution of the indication does not respond to perturbations in the detection signal causing the detection signal to cross the first nominal transition point $T_1$ by less than the corresponding transition threshold $\delta_{1i}$;

wherein the control circuit applies a smoothing function to the detection signal to generate a conditioned signal, the smoothing function being configured to attenuate perturbations and transient fluctuations in the detection signal.

11. The detection system of claim 10, wherein:

the transition threshold $\delta_{Ni}$ for each corresponding $T_N$ is an upper transition threshold, and, the control signal is generated such that the indication changes from $S_1$ to $S_2$ in response to an increase in the detection signal from below $T_1$ to above $T_1$ only when the detection signal exceeds T1 by $\delta_{1i}$.

12. The detection system of claim 10, wherein:

the predetermined indication response profile further defines a lower transition threshold $(\delta_{Nj})$ for each corresponding $T_N$, and, the control signal is generated such that the indication changes from $S_1$ to a third spatial distribution $(S_3)$ in response to a decrease in the detection signal from above $T_1$ to below $T_1$ only when the detection signal decreases below $T_1$ by a corresponding lower transition threshold (61j).

13. The detection system of claim 10, wherein the unitary housing comprises mounting elements configured to affix the detection system to a stationary object.

14. The detection system of claim 10, wherein the sensor comprises:

an emitter configured to launch a first signal; and, a receiver configured to generate, in response to receiving a reflected signal from reflection of the first signal off the at least one target, the detection signal.

15. The detection system of claim 10, wherein:

the sensor comprises a distance sensor, and, the physical relationship comprises distance from the at least one target to the sensor.

16. The detection system of claim 10, wherein:

the predetermined indication response profile further defines a plurality of predetermined spectral bands corresponding to at least one of the $T_N$ such that the control signal is generated to cause the indicator array to generate the indication such that the indication is spectrally distributed, wherein the generated indication changes from a first spectral distribution $(C_1)$ to a second spectral distribution $(C_2)$ in response to the detection signal crossing a second nominal transition point $(T_2)$ by a corresponding transition threshold $(\delta_{2i})$ such that spectral distribution of the indication does not respond to perturbations in the detection signal causing the detection signal to cross $T_2$ by less than $\delta_{2i}$.

17. The detection system of claim 16, wherein $T_2$ is $T_1$.

18. The detection system of claim 16, wherein $\delta_{2i}$ is $\delta_{1i}$.

19. The detection system of claim 10, wherein the control circuit further comprise a training module configured to train the predetermined indication response profile as a function of user input and the detection signal.

20. The detection system of claim 10, wherein the indicator array is configured to emit the spatially-distributed indication such that the spatially-distributed indication is a visible indication visible from a field of view of at least 180°.

* * * * *